United States Patent
Reddy et al.

(10) Patent No.: US 10,735,725 B2
(45) Date of Patent: Aug. 4, 2020

(54) BOUNDARY-INTERSECTION-BASED DEBLOCK FILTERING

(71) Applicant: Microsoft Technology Licensing, LLC, Redmond, WA (US)

(72) Inventors: Bakkama Srinath Reddy, Redmond, WA (US); Victor Cherepanov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 15/265,651

(22) Filed: Sep. 14, 2016

(65) Prior Publication Data

US 2018/0077414 A1    Mar. 15, 2018

(51) Int. Cl.
| | |
|---|---|
| *H04N 19/117* | (2014.01) |
| *H04N 19/86* | (2014.01) |
| *H04N 19/82* | (2014.01) |
| *H04N 19/139* | (2014.01) |
| *H04N 19/176* | (2014.01) |

(52) U.S. Cl.
CPC ......... *H04N 19/117* (2014.11); *H04N 19/139* (2014.11); *H04N 19/176* (2014.11); *H04N 19/82* (2014.11); *H04N 19/86* (2014.11)

(58) Field of Classification Search
CPC ........................... H04N 19/117; H04N 19/139
USPC ........................................................ 375/240
See application file for complete search history.

(56) References Cited

U.S. PATENT DOCUMENTS

| | | | |
|---|---|---|---|
| 7,995,849 B2 | 8/2011 | Raveendran et al. | |
| 8,111,760 B2 | 2/2012 | Hung et al. | |
| 8,194,757 B2 | 6/2012 | Schoner | |
| 8,964,833 B2 | 2/2015 | Auwera et al. | |
| 2005/0013494 A1* | 1/2005 | Srinivasan | H04N 19/139 382/233 |
| 2007/0076973 A1 | 4/2007 | Ali et al. | |

(Continued)

FOREIGN PATENT DOCUMENTS

WO    WO 2016/043933    3/2016

OTHER PUBLICATIONS

Kumar et al., "Post Reconstruction Filters in Video Compression," PathPartner White Paper, 8 pp. (Apr. 2015).

*Primary Examiner* — Frederick D Bailey
*Assistant Examiner* — Amir Shahnami
(74) *Attorney, Agent, or Firm* — Klarquist Sparkman, LLP

(57) ABSTRACT

A video encoder or video decoder buffers multiple blocks of a reconstructed picture of a video sequence. The video encoder/decoder performs deblock filtering between at least some of the multiple blocks. As part of the deblock filtering, the video encoder/decoder selectively filters at least some sample values in a diagonal line that crosses a block-boundary intersection between two diagonally adjacent blocks. When filtering sample values at the block-boundary intersection between four blocks, the video encoder/decoder can evaluate characteristics of all four blocks and adjust sample values in a line between diagonally adjacent blocks. If there is a large visual difference between sample values at corner positions of two diagonally adjacent blocks, the difference can be smoothed by filtering sample values in a diagonal line. In this way, the quality of motion-compensated prediction using the reconstructed picture is improved in many cases.

19 Claims, 17 Drawing Sheets

(56) References Cited

U.S. PATENT DOCUMENTS

| | | | |
|---|---|---|---|
| 2008/0095244 A1* | 4/2008 | Kim | H04N 19/527 |
| | | | 375/240.24 |
| 2011/0194614 A1 | 8/2011 | Norkin et al. | |
| 2011/0200103 A1* | 8/2011 | Kim | H04N 19/159 |
| | | | 375/240.03 |
| 2013/0170562 A1 | 7/2013 | Van der Auwera et al. | |
| 2013/0259141 A1 | 10/2013 | Van der Auwera et al. | |
| 2014/0185665 A1 | 7/2014 | Pu et al. | |
| 2014/0328413 A1 | 11/2014 | Esenlik et al. | |
| 2014/0334544 A1 | 11/2014 | Drugeon et al. | |
| 2015/0245024 A1 | 8/2015 | Shin et al. | |
| 2015/0365666 A1 | 12/2015 | Dong et al. | |
| 2016/0165238 A1* | 6/2016 | Cheung | H04N 19/86 |
| | | | 375/240.24 |

* cited by examiner software 180 implementing one or more innovations
for boundary-intersection-based deblock filtering

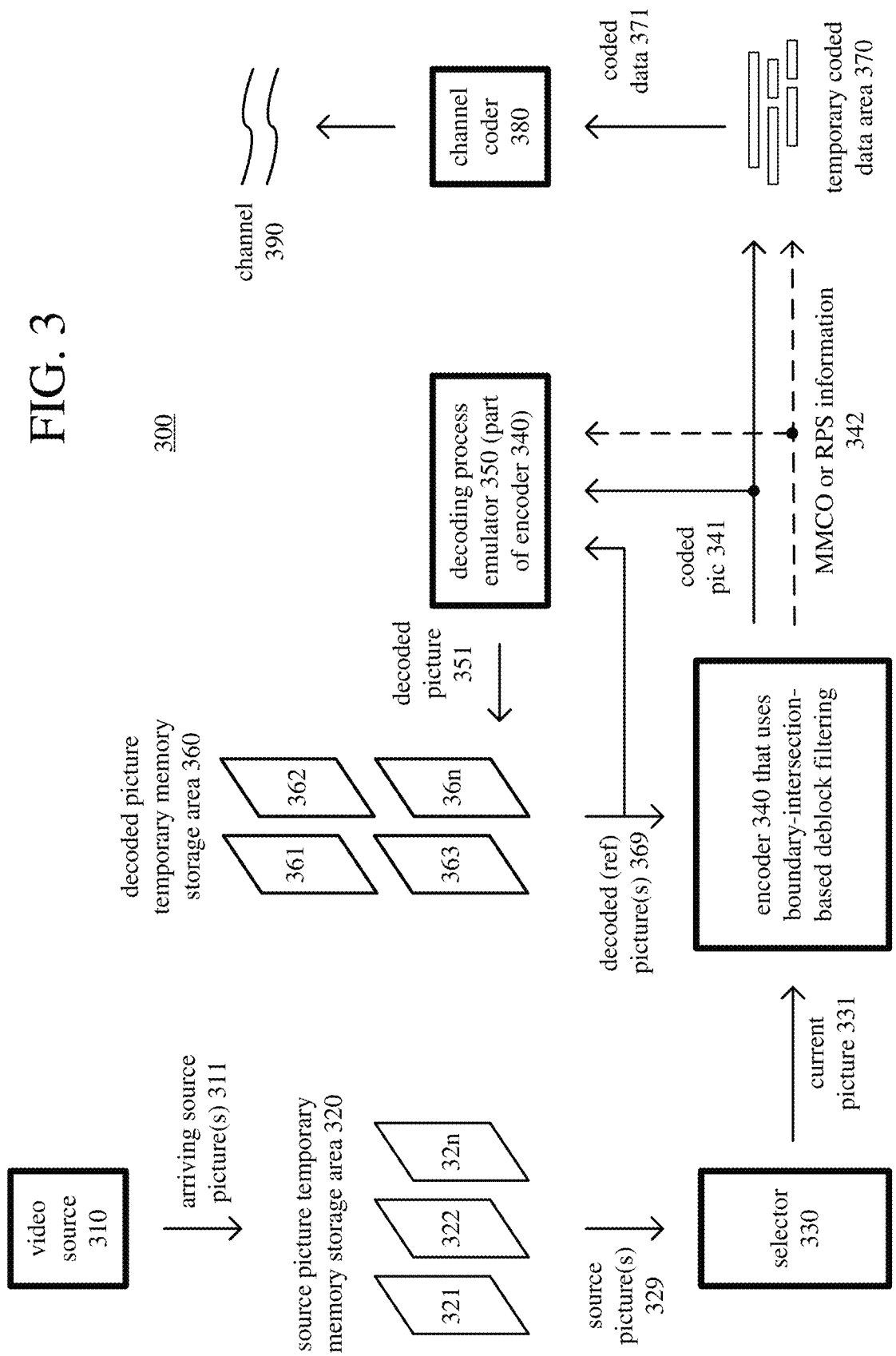

400

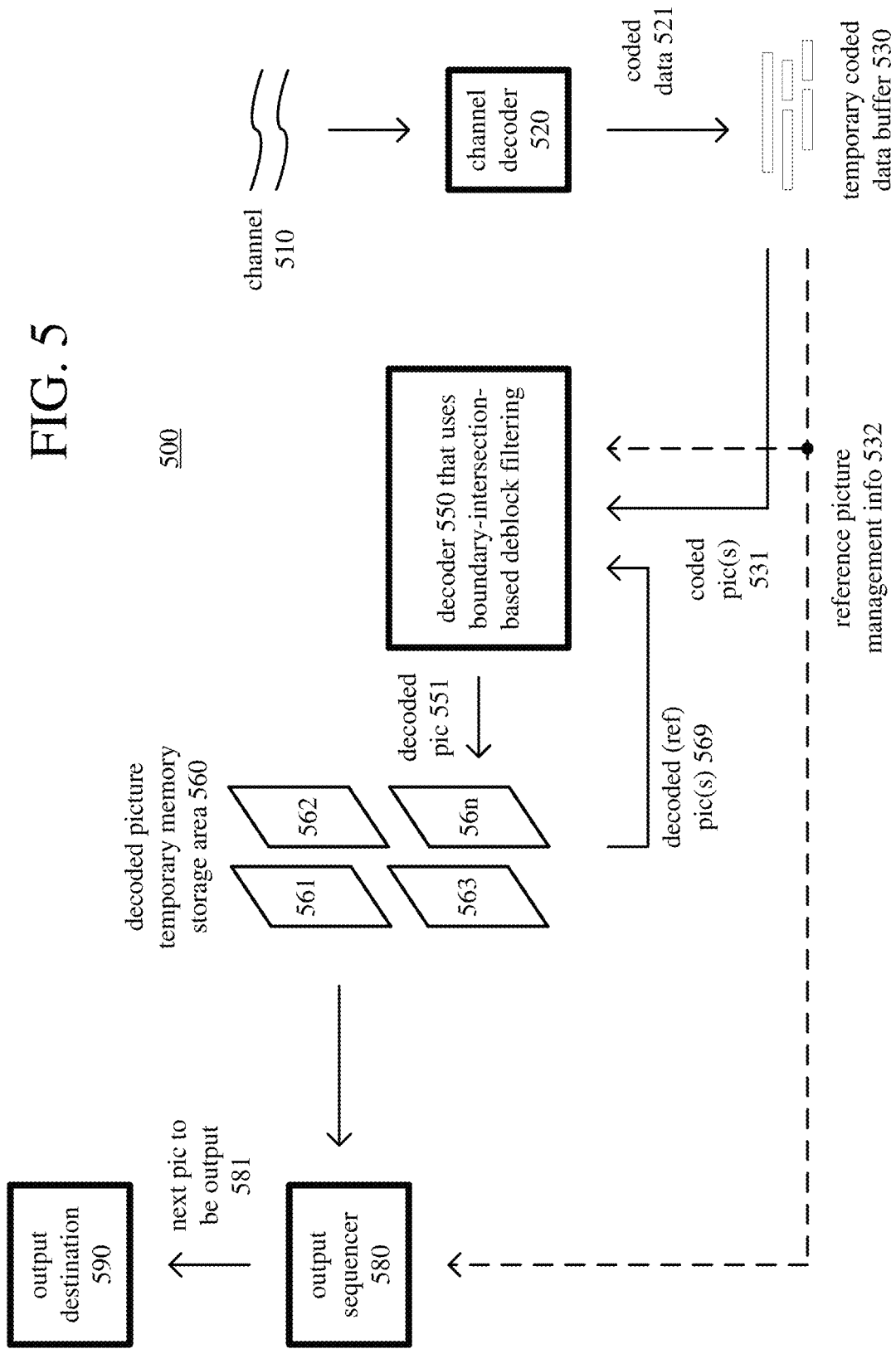

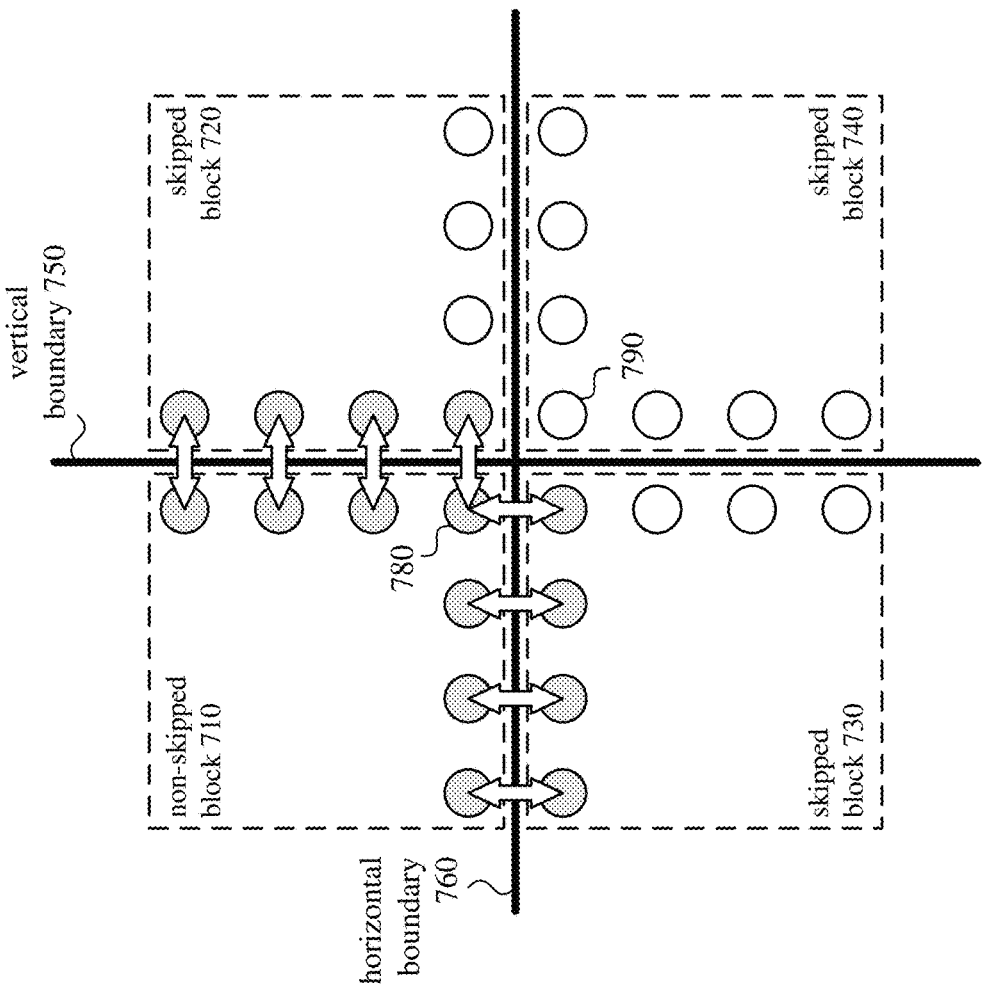

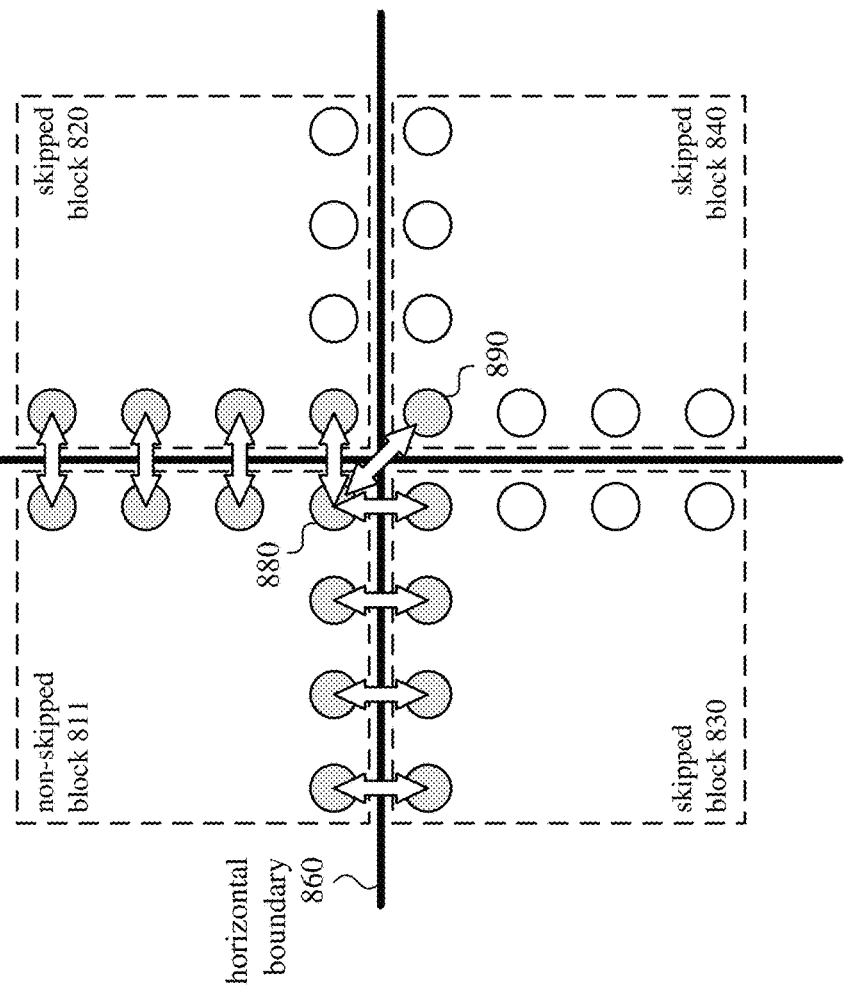

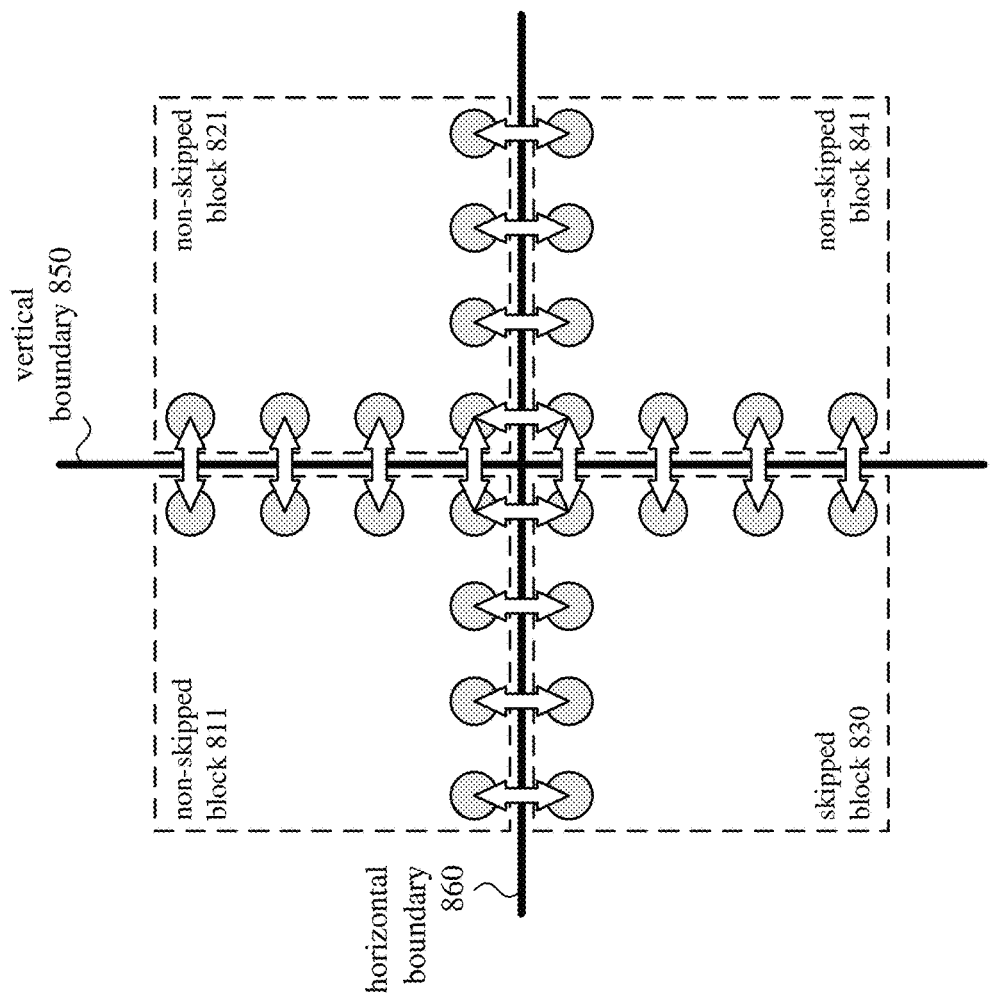

FIG. 8d example of boundary-intersection-based deblock filtering (case 4)

- sample values across a vertical boundary (850) between a non-skipped block and horizontally adjacent block may be filtered horizontally
- sample values across a horizontal boundary (860) between a non-skipped block and vertically adjacent block may be filtered vertically
- same behavior as boundary-based deblock filtering

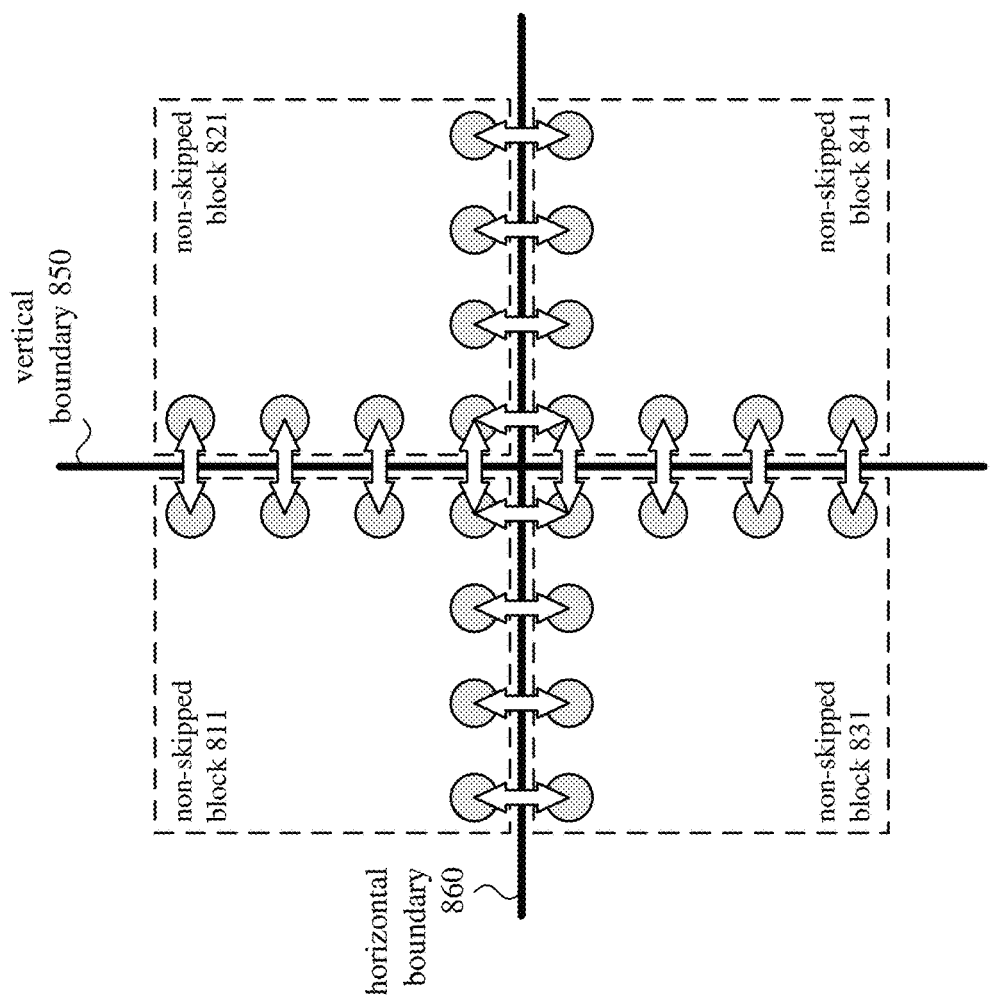

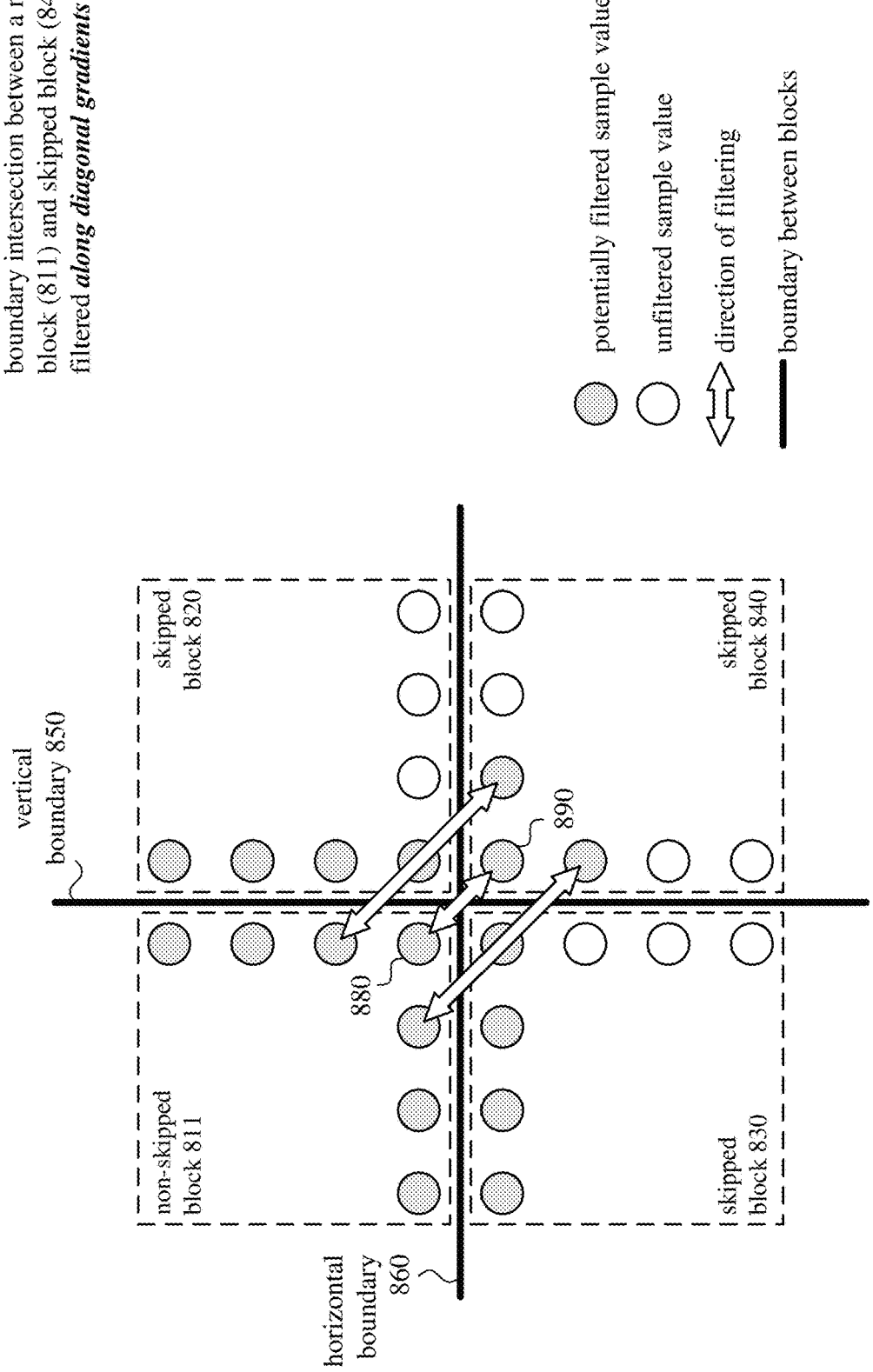

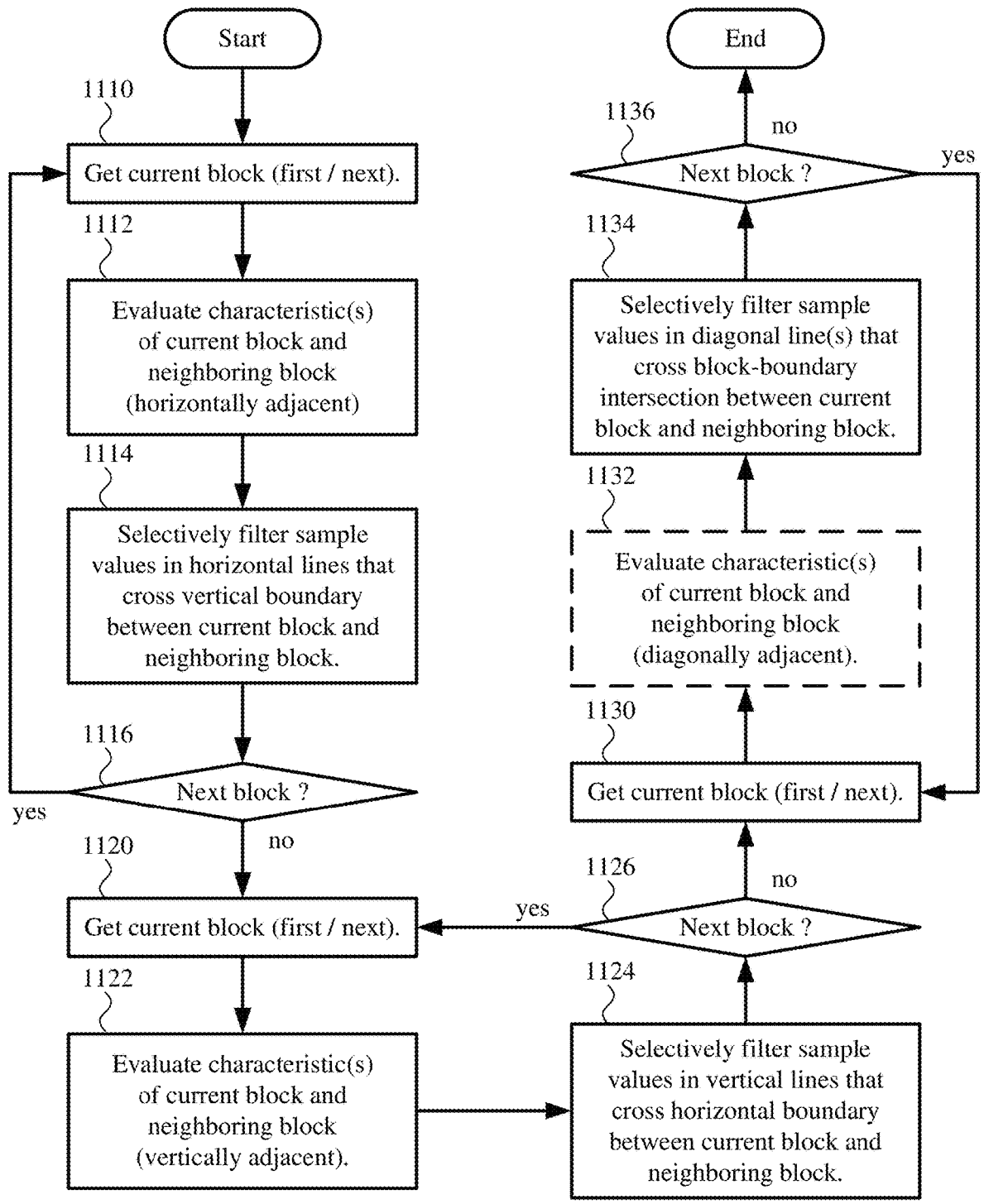

FIG. 12c    1203
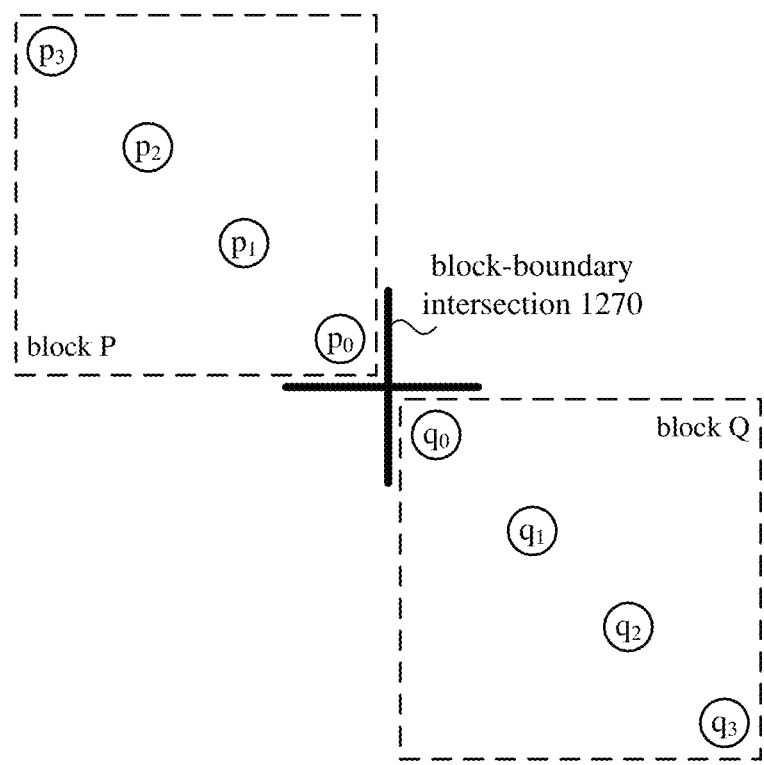

BOUNDARY-INTERSECTION-BASED DEBLOCK FILTERING

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

Digital video can consume an extremely high amount of bits. The number of bits that is used per second of represented video content is known as the bit rate. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

In general, video compression techniques include "intra-picture" compression and "inter-picture" compression. Whereas intra-picture compression compresses a given picture using information within that picture, inter-picture compression compresses a given picture with reference to a preceding and/or following picture or pictures. Inter-picture compression techniques often use motion estimation and motion compensation to reduce bit rate by exploiting temporal redundancy in a video sequence. In one common technique, an encoder using motion estimation attempts to match a current block of sample values in a current picture with a candidate block of the same size in a search area in another picture, the reference picture. A reference picture is, in general, a picture that contains sample values that may be used for prediction in the encoding and decoding process of other pictures. For a current block, when the video encoder finds an exact or "close enough" match in the search area in the reference picture, the video encoder parameterizes the change in position between the current and candidate blocks as motion data such as a motion vector ("MV"). In general, motion compensation is a process of reconstructing pictures from reference picture(s) using motion data.

When encoding a block of a picture, an encoder often computes the sample-by-sample differences (also called residual values or error values) between the sample values of the block and its prediction (e.g., motion-compensated prediction or intra-picture prediction). The residual values may then be encoded. For the residual values, encoding efficiency depends on the complexity of the residual values and how much loss or distortion is introduced by quantization operations as part of the compression process. In general, a good motion-compensated prediction closely approximates a block, such that the residual values include few significant values, and the residual values can be efficiently encoded. On the other hand, a poor motion-compensated prediction often yields residual values that include many significant values, which are more difficult to encode efficiently.

Quantization and other "lossy" processing during compression of a picture can result in visible lines at boundaries between blocks or sub-blocks of the picture when it is reconstructed. Such "blocking artifacts" might occur, for example, if adjacent blocks in a smoothly changing region of a picture (such as a sky area) are quantized to different average levels. Blocking artifacts can be especially troublesome in pictures that are used as reference pictures for motion compensation processes during encoding and decoding, since they tend to hurt the quality of motion-compensated prediction. To reduce blocking artifacts in a reference picture, an encoder and decoder can use "deblock" filtering to smooth discontinuities at horizontal boundaries and vertical boundaries between blocks and/or sub-blocks in the reference picture. The filtering is "in-loop" in that it occurs inside a motion-compensation loop—the encoder and decoder perform it on reference pictures used later in encoding/decoding. Deblock filtering typically improves quality by providing better motion-compensated prediction and lower bitrate for prediction residuals, thereby increasing coding efficiency. For this reason, in-loop deblock filtering is usually enabled during encoding, in which case a decoder also performs in-loop deblock filtering.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10), and H.265 (ISO/IEC 23008-2) standards, the MPEG-1 (ISO/IEC 11172-2) and MPEG-4 Visual (ISO/IEC 14496-2) standards, and the SMPTE 421M standard. A video codec standard typically defines options for the syntax of an encoded video bitstream, detailing parameters in the bitstream when particular features are used in encoding and decoding. In many cases, a video codec standard also provides details about the decoding operations a video decoder should perform to achieve conforming results in decoding. Aside from codec standards, various proprietary codec formats such as VP6, VP8, and VP9 define options for the syntax of an encoded video bitstream and corresponding decoding operations.

Various video codec standards and formats incorporate in-loop deblock filtering. The details of the filtering vary depending on the standard or format, and can be quite complex. Even within a standard or format, the rules of applying deblock filtering across a vertical or horizontal block boundary can vary depending on factors such as content/smoothness, values of motion vectors for blocks/sub-blocks on different sides of the block boundary, block/sub-block size, and coded/not coded status (e.g., whether transform coefficient information is signaled in the bitstream).

Previous approaches to in-loop deblock filtering use boundary-based filtering at horizontal boundaries and vertical boundaries between blocks/sub-blocks. Sample values across certain horizontal boundaries and across certain vertical boundaries between blocks/sub-blocks are selectively filtered, depending on various factors. While such deblock filtering provides good performance in most cases, it can leave noticeable distortion in some scenarios. For example, consider sample values at corner positions of four blocks that meet at a block-boundary intersection, where one of the blocks is coded and the other three blocks are not coded. In this configuration, there can be a large visual difference between sample values at corner positions of two diagonally adjacent blocks, one coded and one not coded. Previous approaches to in-loop deblock filtering that use boundary-based filtering do not adequately compensate for distortion at such corner positions.

SUMMARY

In summary, the detailed description presents innovations in boundary-intersection-based deblock filtering. For example, when filtering sample values at a block-boundary intersection between four blocks of a reconstructed picture, a video encoder or video decoder can evaluate characteristics of all four blocks and adjust sample values in a diagonal line between diagonally adjacent blocks across the block-boundary intersection. If there is a large visual difference between sample values at corner positions of two diagonally adjacent blocks, the difference can be smoothed by filtering sample values in a diagonal line across the block-boundary intersection.

According to one aspect of the innovations described herein, a video encoder or video decoder buffers multiple blocks of a reconstructed picture of a video sequence. The video encoder/decoder performs deblock filtering between at least some of the multiple blocks. As part of the deblock filtering, the video encoder/decoder can evaluate one or more characteristics of (a) a current block among the multiple blocks, (b) a first neighboring block (horizontally adjacent the current block), (c) a second neighboring block (vertically adjacent the current block), and/or (d) a third neighboring block (diagonally adjacent the current block, vertically adjacent the first neighboring block, and horizontally adjacent the second neighboring block). The characteristic(s) that are evaluated for a block can include a count of non-zero transform coefficients, a value of a motion vector, a reference picture used in motion compensation, skipped/not-skipped status, and/or another characteristic.

As part of the deblock filtering, the video encoder/decoder selectively filters at least some sample values in a diagonal line that crosses a block-boundary intersection between two diagonally adjacent blocks among the multiple blocks. For example, the diagonal line has an angle of 45 degrees or 135 degrees. The selective filtering can depend at least in part on the at least some sample values in the diagonal line that crosses the block-boundary intersection between the two diagonally adjacent blocks. The selective filtering can affect a single sample value in each of the two diagonally adjacent blocks, or it can affect multiple sample values in each of the two diagonally adjacent blocks. The deblock filtering can also include selectively filtering at least some sample values in a horizontal line that crosses a vertical boundary between the current block and the first neighboring block and/or selectively filtering at least some sample values in a vertical line that crosses a horizontal boundary between the current block and the second neighboring block.

After the deblock filtering, the video encoder/decoder can use the reconstructed picture, including the at least some filtered sample values, as a reference picture during motion compensation for a subsequent picture in the video sequence. In this way, the quality of motion-compensated prediction using the reference picture is improved in many cases.

The innovations can be implemented as part of a method, as part of a computing system configured to perform operations for the method, or as part of one or more computer-readable media storing computer-executable instructions for causing a computing system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 3 is a diagram illustrating an example video encoder system.

FIG. 5 is a diagram illustrating an example video decoder system.

FIG. 7 is a diagram illustrating an example of boundary-based deblock filtering.

FIGS. 8a-8e and 9 are diagrams illustrating examples of boundary-intersection-based deblock filtering.

FIG. 11 is a flowchart illustrating an example technique for applying boundary-intersection-based deblock filtering to sample values of blocks of a reconstructed picture.

FIGS. 12a, 12b, and 12c show examples of sample values evaluated and, in some cases, adjusted in boundary-intersection-based deblock filtering operations.

DETAILED DESCRIPTION

The detailed description presents innovations in boundary-intersection-based deblock filtering. For example, when filtering sample values at a block-boundary intersection between four blocks of a reconstructed picture, a video encoder or video decoder can evaluate characteristics of all four blocks and adjust sample values in a vertical line between horizontally adjacent blocks, in a horizontal line between vertically adjacent blocks, and/or in a diagonal line between diagonally adjacent blocks across the block-boundary intersection. In particular, when there is a large visual difference between sample values at corner positions of two diagonally adjacent blocks, the difference can be smoothed by filtering sample values in a diagonal line across the block-boundary intersection. This, in turn, can improve the quality of motion-compensated prediction that uses the reconstructed picture as a reference picture, especially when one or more of the blocks at the block-boundary intersection lacks non-zero transform coefficients in the bitstream.

Some of the innovations described herein are illustrated with reference to terms specific to extensions or variations of the H.264 standard or H.265 standard. The innovations described herein can also be implemented for extensions or variations of other video codec standards or formats (e.g., the VP8 format or VP9 format).

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems.

I. Example Computer Systems.

Figure 1:
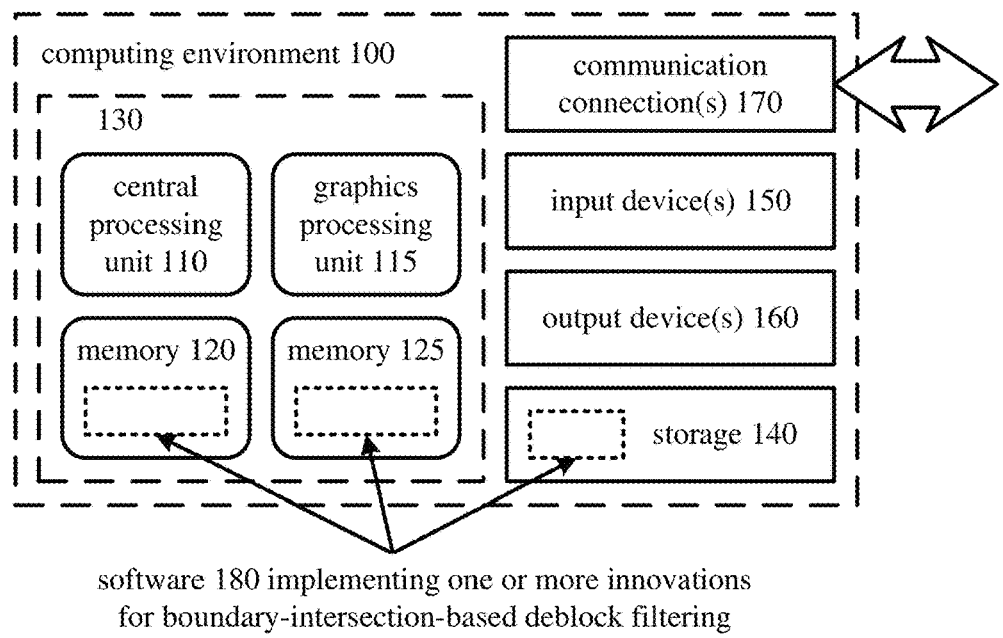
FIG. 1 is a diagram illustrating an example computing system in which some described embodiments can be implemented.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a GPU (115). In general, the GPU (115) is any specialized circuit, different from the CPU (110), that accelerates creation and/or manipulation of image data in a graphics pipeline. The GPU (115) can be implemented as part of a dedicated graphics card (video card), as part of a motherboard, as part of a system on a chip ("SoC"), or in some other way (even on the same die as the CPU (110)).

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPU (110), and the memory (125) is GPU memory, accessible to the GPU (115). Depending on architecture (e.g., whether the GPU (115) is part of a video card, motherboard, or SoC), the CPU memory can be completely separate from the GPU memory, or the CPU memory and GPU memory can, at least in part, be shared memory or drawn from the same source (e.g., RAM). The memory (120, 125) stores software (180) implementing one or more innovations for boundary-intersection-based deblock filtering, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations for boundary-intersection-based deblock filtering.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine" and "perform" to describe computer operations in a computer system. These terms are high-level abstractions for operations performed by a computer, and should not be confused with acts performed by a human being. The actual computer operations corresponding to these terms vary depending on implementation.

II. Example Network Environments.

Figure 2A:
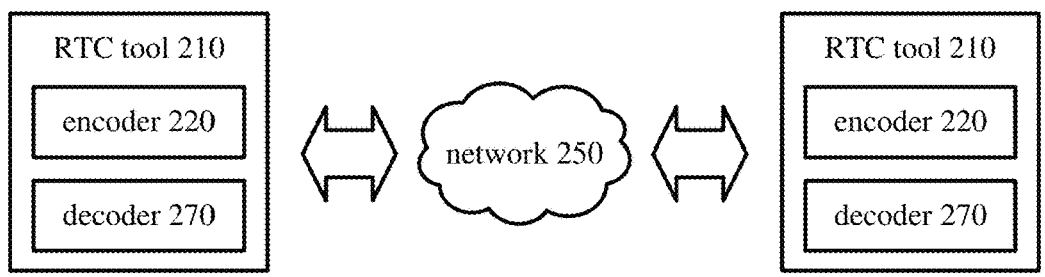
FIGS. 2a and 2b are diagrams illustrating example network environments in which some described embodiments can be implemented.
Figure 2B:
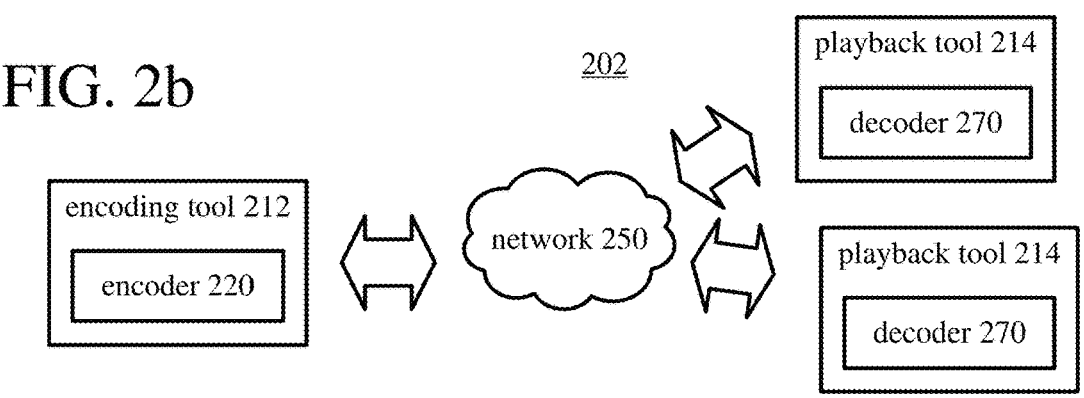

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with an extension or variation of the H.265/HEVC standard, SMPTE 421M standard, ISO/IEC 14496-10 standard (also known as H.264/AVC), another standard, or a proprietary format such as VP8 or VP9, with a corresponding decoder (270) accepting encoded data from the encoder (220). The bidirectional communication can be part of a video conference, video telephone call, or other two-party or multi-party communication scenario. Although the network environment (201) in FIG. 2a includes two RTC tools (210), the network environment (201) can instead include three or more RTC tools (210) that participate in multi-party communication.

An RTC tool (210) manages encoding by an encoder (220) and also manages decoding by a decoder (270). FIG. 3 shows an example video encoder system (300) that can be included in the RTC tool (210). Alternatively, the RTC tool (210) uses another encoder system. FIG. 5 shows an example video decoder system (500) that can be included in the RTC tool (210). Alternatively, the RTC tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or sharing, wireless screen casting, cloud computing or gaming, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

The encoding tool (212) can include server-side controller logic for managing connections with one or more playback tools (214). FIG. 3 shows an example video encoder system (300) that can be included in the encoding tool (212). Alternatively, the encoding tool (212) uses another encoder system. A playback tool (214) can include client-side controller logic for managing connections with the encoding tool (212). FIG. 5 shows an example video decoder system (500) that can be included in the playback tool (214). Alternatively, the playback tool (214) uses another decoder system.

III. Example Video Encoder Systems.

FIG. 3 shows an example video encoder system (300) in conjunction with which some described embodiments may be implemented. The video encoder system (300) includes a video encoder (340) that uses boundary-intersection-based deblock filtering with one or more of the innovations described herein. The video encoder (340) is further detailed in FIGS. 4a and 4b.

The video encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The video encoder system (300) can be adapted for encoding of a particular type of content. The video encoder system (300) can be implemented as part of an operating system module, as part of an application library, as part of a standalone application, or using special-purpose hardware. Overall, the video encoder system (300) receives a sequence of source video pictures (311) from a video source (310) and produces encoded data as output to a channel (390). The encoded data output to the channel can include content encoded using one or more of the innovations described herein.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320) to encode as the current picture (331). The order in which pictures are selected by the picture selector (330) for input to the video encoder (340) may differ from the order in which the pictures are produced by the video source (310), e.g., the encoding of some pictures may be delayed in order, so as to allow some later pictures to be encoded first and to thus facilitate temporally backward prediction. Before the video encoder (340), the video encoder system (300) can include a pre-processor (not shown) that performs pre-processing of the current picture (331) before encoding. The pre-processing can include color space conversion and resampling processing (e.g., to reduce the spatial resolution of chroma components) for encoding.

In general, a pixel is the set of one or more collocated sample values for a location in a picture, which may be arranged in different ways for different chroma sampling formats. Typically, before encoding, the sample values of video are converted to a color space such as a YUV color space, in which sample values of a luma (Y) component represent brightness or intensity values, and sample values of chroma (U, V) components represent color-difference values. The precise definitions of the color-difference values (and conversion operations between YUV color space and another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. As used herein, the term YUV also encompasses color spaces such as ICtCp, for which sample values of an intensity (I) component and color-difference (Ct, Cp) components correspond to luma component and chroma components, respectively. Chroma sample values may be sub-sampled to a lower chroma sampling rate (e.g., for a YUV 4:2:0 format) in order to reduce the spatial resolution of chroma sample values, or the chroma sample values may have the same resolution as the luma sample values (e.g., for a YUV 4:4:4 format).

Figure 4A:
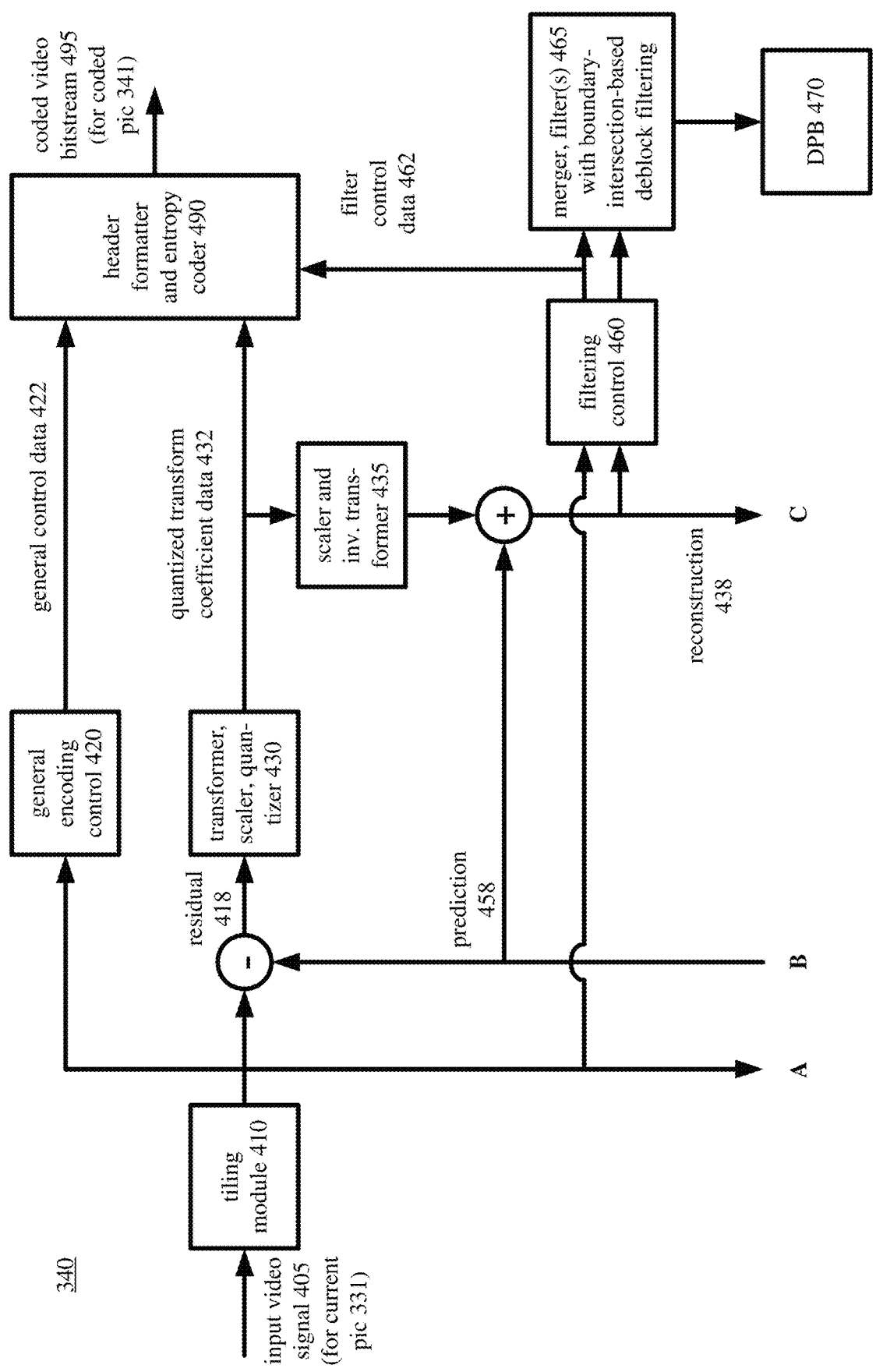
FIGS. 4a and 4b are diagrams illustrating an example video encoder, in conjunction with which some described embodiments can be implemented.
Figure 4B:
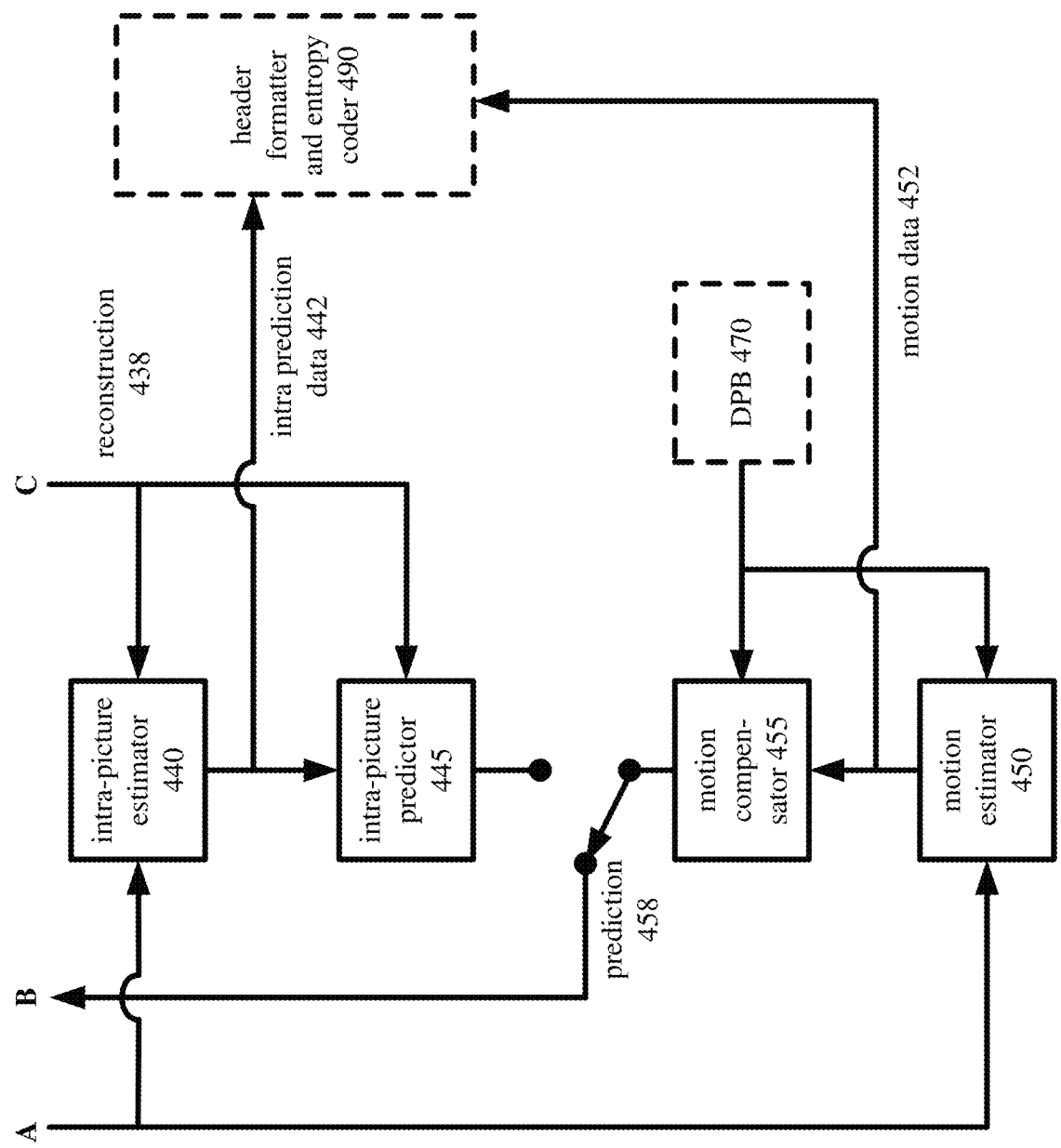

The video encoder (340) encodes the current picture (331) to produce a coded picture (341). As shown in FIGS. 4a and 4b, the video encoder (340) receives the current picture (331) as an input video signal (405) and produces encoded data for the coded picture (341) in a coded video bitstream (495) as output. As part of the encoding, the video encoder (340) in some cases uses one or more of the innovations for boundary-intersection-based deblock filtering as described herein.

Generally, the video encoder (340) includes multiple encoding modules that perform encoding tasks such as splitting into tiles, intra-picture prediction estimation and prediction, motion estimation and compensation, frequency transforms, quantization, and entropy coding. Many of the components of the video encoder (340) are used for both intra-picture coding and inter-picture coding. The exact operations performed by the video encoder (340) can vary depending on compression format and can also vary depending on encoder-optional implementation decisions.

As shown in FIG. 4a, the video encoder (340) can include a tiling module (410). With the tiling module (410), the video encoder (340) can split a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further split into blocks or other sets of sample values for purposes of encoding and decoding. Blocks may be further sub-divided at different stages, e.g., at the prediction, frequency transform and/or entropy encoding stages. For example, a picture can be divided into 64×64 blocks, 32×32 blocks, or 16×16 blocks, which can in turn be divided into smaller blocks of sample values for coding and decoding.

For syntax according to the H.264/AVC standard, the video encoder (340) can split a picture into one or more slices of the same size or different sizes. The video encoder (340) splits the content of a picture (or slice) into 16×16 macroblocks. A macroblock ("MB") includes luma sample values organized as four 8×8 luma blocks and corresponding chroma sample values organized as 8×8 chroma blocks. Generally, a MB has a prediction mode such as inter or intra. A MB includes one or more prediction units (e.g., 8×8 blocks, 4×4 blocks, which may be called partitions for inter-picture prediction) for purposes of signaling of prediction information (such as prediction mode details, MV information, etc.) and/or prediction processing. A MB also has one or more residual data units for purposes of residual coding/decoding.

For syntax according to the H.265/HEVC standard, the video encoder (340) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the video encoder. A luma CTB can contain, for example, 64×64, 32×32, or 16×16 luma sample values. A CTU includes one or more coding units. A coding unit ("CU") has a luma coding block ("CB") and two corresponding chroma CBs. For example, according to quadtree syntax, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs according to quadtree syntax. Or, as another example, according to quadtree syntax, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs according to quadtree syntax.

In H.265/HEVC implementations, a CU has a prediction mode such as inter or intra. A CU typically includes one or more prediction units for purposes of signaling of prediction information (such as prediction mode details, displacement values, etc.) and/or prediction processing. A prediction unit ("PU") has a luma prediction block ("PB") and two chroma PBs. For an inter-picture-predicted CU, the CU can have one, two, or four PUs, where splitting into four PUs is allowed only if the CU has the smallest allowable size.

In H.265/HEVC implementations, a CU also typically has one or more transform units for purposes of residual coding/decoding, where a transform unit ("TU") has a luma transform block ("TB") and two chroma TBs. A CU may contain a single TU (equal in size to the CU) or multiple TUs. According to quadtree syntax, a TU can be split into four smaller TUs, which may in turn be split into smaller TUs according to quadtree syntax. The video encoder decides how to split video into CTUs (CTBs), CUs (CBs), PUs (PBs) and TUs (TBs).

As used herein, the term "block" can indicate a MB, residual data unit, CTB, CB, PB or TB, or some other set of sample values, depending on context. The term "unit" can indicate a MB, CTU, CU, PU, TU or some other set of blocks, or it can indicate a single block, depending on context.

As shown in FIG. 4a, the video encoder (340) includes a general encoding control (420), which receives the input video signal (405) for the current picture (331) as well as feedback (not shown) from various modules of the video encoder (340). Overall, the general encoding control (420) provides control signals (not shown) to other modules, such as the tiling module (410), transformer/scaler/quantizer (430), scaler/inverse transformer (435), intra-picture prediction estimator (440), motion estimator (450), and intra/inter switch, to set and change coding parameters during encoding. The general encoding control (420) can evaluate intermediate results during encoding, typically considering bit rate costs and/or distortion costs for different options. In particular, the general encoding control (420) decides whether to use intra-picture prediction or inter-picture prediction for the units of the current picture (331). If inter-picture prediction is used for a unit, in conjunction with the motion estimator (450), the general encoding control (420) decides which reference picture(s) to use for the inter-picture prediction. The general encoding control (420) determines which reference pictures to retain in a decoded picture buffer ("DPB") or other buffer. The general encoding control (420) produces general control data (422) that indicates decisions made during encoding, so that a corresponding decoder can make consistent decisions. The general control data (422) is provided to the header formatter/entropy coder (490).

With reference to FIG. 4b, if a unit of the current picture (331) is predicted using inter-picture prediction, a motion estimator (450) estimates the motion of blocks of sample values of the unit with respect to one or more reference pictures. The current picture (331) can be entirely or partially coded using inter-picture prediction. When multiple reference pictures are used, the multiple reference pictures can be from different temporal directions or the same temporal direction. The motion estimator (450) evaluates candidate MVs. The motion estimator (450) can evaluate different partition patterns for motion compensation for partitions of a given unit of the current picture (331) (e.g., 2N×2N, 2N×N, N×2N, or N×N partitions for PUs of a CU in the H.265/HEVC standard). The DPB (470), which is an example of decoded picture temporary memory storage area (360) as shown in FIG. 3, buffers one or more reconstructed previously coded pictures for use as reference pictures.

The motion estimator (450) produces motion data (452) as side information. In particular, the motion data (452) can include information that indicates whether contextual motion mode (e.g., merge mode in the H.265/HEVC standard) is used and, if so, the candidate MV for contextual motion mode (e.g., merge mode index value in the H.265/HEVC standard). More generally, the motion data (452) can include MV data and reference picture selection data. The motion data (452) is provided to the header formatter/entropy coder (490) as well as the motion compensator (455). The motion compensator (455) applies MV(s) for a block to the reconstructed reference picture(s) from the DPB (470) or other buffer. For the block, the motion compensator (455) produces a motion-compensated prediction, which is an area of sample values in the reference picture(s) that are used to generate motion-compensated prediction values for the block.

With reference to FIG. 4b, if a unit of the current picture (331) is predicted using intra-picture prediction, an intra-picture prediction estimator (440) determines how to perform intra-picture prediction for blocks of sample values of the unit. The current picture (331) can be entirely or partially coded using intra-picture prediction. Using values of a reconstruction (438) of the current picture (331), for intra spatial prediction, the intra-picture prediction estimator (440) determines how to spatially predict sample values of a block of the current picture (331) from previously reconstructed sample values of the current picture (331), e.g., selecting an intra-picture prediction mode. Or, for intra block copy mode, the intra-picture prediction estimator (440) determines how to predict sample values of a block of the current picture (331) using an offset (sometimes called a block vector) that indicates a previously encoded/decoded portion of the current picture (331). Intra block copy mode can be implemented as a special case of inter-picture prediction in which the reference picture is the current picture (331), and only previously encoded/decoded sample values of the current picture (331) can be used for prediction. As side information, the intra-picture prediction estimator (440) produces intra prediction data (442), such as the prediction mode/direction used. The intra prediction data (442) is provided to the header formatter/entropy coder (490) as well as the intra-picture predictor (445).

According to the intra prediction data (442), the intra-picture predictor (445) spatially predicts sample values of a block of the current picture (331) from previously reconstructed sample values of the current picture (331), producing intra-picture predicted sample values for the block. Or, the intra-picture predictor (445) predicts sample values of the block using intra block copy prediction, using an offset (block vector) for the block.

As shown in FIG. 4b, the intra/inter switch selects whether the predictions (458) for a given unit will be motion-compensated predictions or intra-picture predictions. Intra/inter switch decisions for units of the current picture (331) can be made using various criteria.

The video encoder (340) can determine whether or not to encode and transmit the differences (if any) between a block's prediction values (intra or inter) and corresponding original values. The differences (if any) between a block of the prediction (458) and a corresponding part of the original current picture (331) of the input video signal (405) provide values of the residual (418). If encoded/transmitted, the values of the residual (418) are encoded using a frequency transform (if the frequency transform is not skipped), quantization, and entropy encoding. In some cases, no residual is calculated for a unit. Instead, residual coding is skipped, and the predicted sample values are used as the reconstructed sample values.

With reference to FIG. 4a, when values of the residual (418) are encoded, in the transformer/scaler/quantizer (430), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of values of the residual (418) (or sample value data if the prediction (458) is null), producing blocks of frequency transform coefficients. The transformer/scaler/quantizer (430) can apply a transform with variable block sizes. In this case, the transformer/scaler/quantizer (430) can determine which block sizes of transforms to use for the residual values for a current block. For example, in H.265/HEVC implementations, the transformer/scaler/quantizer (430) can split a TU by quadtree decomposition into four smaller TUs, each of which may in turn be split into four smaller TUs, down to a minimum TU size. In H.265/HEVC implementations, the frequency transform can be skipped. In this case, values of the residual (418) can be quantized and entropy coded.

With reference to FIG. 4a, in the transformer/scaler/quantizer (430), a scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis, or other basis. The quantization step size can depend on a quantization parameter ("QP"), whose value is set for a picture, tile, slice, and/or other portion of video. The quantized transform coefficient data (432) is provided to the header formatter/entropy coder (490). If the frequency transform is skipped, the scaler/quantizer can scale and quantize the blocks of prediction residual data (or sample value data if the prediction (458) is null), producing quantized values that are provided to the header formatter/entropy coder (490).

As shown in FIGS. 4a and 4b, the header formatter/entropy coder (490) formats and/or entropy codes the general control data (422), quantized transform coefficient data (432), intra prediction data (442), motion data (452), and filter control data (462). The entropy coder of the video encoder (340) compresses quantized transform coefficient values as well as certain side information (e.g., MV information, QP values, mode decisions, parameter choices, filter parameters). Typical entropy coding techniques include Exponential-Golomb coding, Golomb-Rice coding, context-adaptive binary arithmetic coding ("CABAC"), differential coding, Huffman coding, run length coding, variable-length-to-variable-length ("V2V") coding, variable-length-to-fixed-length ("V2F") coding, Lempel-Ziv ("LZ") coding, dictionary coding, and combinations of the above. The entropy coder can use different coding techniques for different kinds of information, can apply multiple techniques in combination (e.g., by applying Exponential-Golomb coding or Golomb-Rice coding as binarization for CABAC), and can choose from among multiple code tables within a particular coding technique.

The video encoder (340) produces encoded data for the coded picture (341) in an elementary bitstream, such as the coded video bitstream (495) shown in FIG. 4a. In FIG. 4a, the header formatter/entropy coder (490) provides the encoded data in the coded video bitstream (495). The syntax of the elementary bitstream is typically defined in a codec standard or format. For example, the format of the coded video bitstream (495) can be an extension or variation of a Windows Media Video format, SMPTE 421M format, MPEG-x format (e.g., MPEG-1, MPEG-2, or MPEG-4), H.26x format (e.g., H.261, H.262, H.263, H.264, H.265), VPx format, or another format. After output from the video encoder (340), the elementary bitstream is typically packetized or organized in a container format, as explained below.

The encoded data in the elementary bitstream includes syntax elements organized as syntax structures. In general, a syntax element can be any element of data, and a syntax structure is zero or more syntax elements in the elementary bitstream in a specified order.

As shown in FIG. 3, the video encoder (340) also produces memory management control operation ("MMCO") signals (342) or reference picture set ("RPS") information. The RPS is the set of pictures that may be used for reference in motion compensation for a current picture or any subsequent picture. If the current picture (331) is not the first picture that has been encoded, when performing its encoding process, the video encoder (340) may use one or more previously encoded/decoded pictures (369) that have been stored in a decoded picture temporary memory storage area (360). Such stored decoded pictures (369) are used as reference pictures for inter-picture prediction of the content of the current picture (331). The MMCO/RPS information (342) indicates to a video decoder which reconstructed pictures may be used as reference pictures, and hence should be stored in a picture storage area such as the DPB (470) in FIGS. 4a and 4b.

The decoding process emulator (350) implements some of the functionality of a video decoder, for example, decoding tasks to reconstruct reference pictures. In a manner consistent with the MMCO/RPS information (342), the decoding process emulator (350) determines whether a given coded picture (341) needs to be reconstructed and stored for use as a reference picture in inter-picture prediction of subsequent pictures to be encoded. If a coded picture (341) needs to be stored (and possibly modified), the decoding process emulator (350) models the decoding process that would be conducted by a video decoder that receives the coded picture (341) and produces a corresponding decoded picture (351).

The decoding process emulator (350) may be implemented as part of the video encoder (340). For example, the decoding process emulator (350) includes certain modules and logic as shown in FIGS. 4a and 4b. During reconstruction of the current picture (331), when values of the residual (418) have been encoded/signaled, reconstructed residual values are combined with the prediction (458) to produce an approximate or exact reconstruction (438) of the original content from the video signal (405) for the current picture (331). (In lossy compression, some information is lost from the video signal (405).)

With reference to FIG. 4a, to reconstruct residual values, in the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the video encoder (340) combines reconstructed residual values with values of the prediction (458) (e.g., motion-compensated prediction values, intra-picture prediction values) to form the reconstruction (438). When residual values have not been encoded/signaled, the video encoder (340) uses the values of the prediction (458) as the reconstruction (438).

With reference to FIGS. 4a and 4b, for intra-picture prediction, the values of the reconstruction (438) can be fed back to the intra-picture prediction estimator (440) and intra-picture predictor (445). The values of the reconstruction (438) can be used for motion-compensated prediction of subsequent pictures. The values of the reconstruction (438) can be further filtered. A filtering control (460) determines how to perform deblock filtering and sample adaptive offset ("SAO") filtering on values of the reconstruction (438), for the current picture (331). The filtering control (460) produces filter control data (462), which is provided to the header formatter/entropy coder (490) and merger/filter(s) (465).

In the merger/filter(s) (465), the video encoder (340) merges content from different tiles into a reconstructed version of the current picture. The video encoder (340) selectively performs deblock filtering and SAO filtering according to the filter control data (462) and rules for filter adaptation, so as to adaptively smooth discontinuities across boundaries in the current picture (331). In particular, the deblock filtering can include boundary-intersection-based deblock filtering as described below. Other filtering (such as de-ringing filtering or adaptive loop filtering ("ALF"); not shown) can alternatively or additionally be applied. Tile boundaries can be selectively filtered or not filtered at all, depending on settings of the video encoder (340), and the video encoder (340) may provide syntax elements within the coded bitstream to indicate whether or not such filtering was applied.

In FIGS. 4a and 4b, the DPB (470) buffers the reconstructed current picture, after filtering by the filter(s) (465), for use in subsequent motion-compensated prediction. More generally, as shown in FIG. 3, the decoded picture temporary memory storage area (360) includes multiple picture buffer storage areas (361, 362, . . . , 36n). In a manner consistent with the MMCO/RPS information (342), the decoding process emulator (350) manages the contents of the storage area (360) in order to identify any picture buffers (361, 362, etc.) with pictures that are no longer needed by the video encoder (340) for use as reference pictures. After modeling the decoding process, the decoding process emulator (350)

stores a newly decoded picture (351) in a picture buffer (361, 362, etc.) that has been identified in this manner.

As shown in FIG. 3, the coded picture (341) and MMCO/RPS information (342) are buffered in a temporary coded data area (370). The coded data that is aggregated in the coded data area (370) contains, as part of the syntax of the elementary bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream or file. Or, more generally, the channel encoder (380) can implement one or more media system multiplexing protocols or transport protocols. The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

Depending on implementation and the type of compression desired, modules of the video encoder system (300) and/or video encoder (340) can be added, omitted, split into multiple modules, combined with other modules, and/or replaced with like modules. In alternative embodiments, encoder systems or encoders with different modules and/or other configurations of modules perform one or more of the described techniques. Specific embodiments of encoder systems typically use a variation or supplemented version of the video encoder system (300). Specific embodiments of video encoders typically use a variation or supplemented version of the video encoder (340). The relationships shown between modules within the video encoder system (300) and video encoder (340) indicate general flows of information in the video encoder system (300) and video encoder (340), respectively; other relationships are not shown for the sake of simplicity. In general, a given module of the video encoder system (300) or video encoder (340) can be implemented by software executable on a CPU, by software controlling special-purpose hardware (e.g., graphics hardware for video acceleration), or by special-purpose hardware (e.g., in an ASIC).

IV. Example Video Decoder Systems.

FIG. 5 is a block diagram of an example video decoder system (500) in conjunction with which some described embodiments may be implemented. The video decoder system (500) includes a video decoder (550) that uses boundary-intersection-based deblock filtering, which is further detailed in FIG. 6.

The video decoder system (500) can be a general-purpose decoding tool capable of operating in any of multiple decoding modes such as a low-latency decoding mode for real-time communication, a transcoding mode, and a higher-latency decoding mode for media playback from a file or stream, or it can be a special-purpose decoding tool adapted for one such decoding mode. The video decoder system (500) can be implemented as part of an operating system module, as part of an application library, as part of a standalone application or using special-purpose hardware. Overall, the video decoder system (500) receives coded data from a channel (510) and produces reconstructed pictures as output for an output destination (590). The received encoded data can include content encoded using one or more of the innovations described herein.

The decoder system (500) includes a channel (510), which can represent storage, a communications connection, or another channel for coded data as input. The channel (510) produces coded data that has been channel coded. A channel decoder (520) can process the coded data. For example, the channel decoder (520) de-packetizes and/or demultiplexes data that has been organized for transmission or storage as a media stream or file. Or, more generally, the channel decoder (520) can implement one or more media system demultiplexing protocols or transport protocols. The channel (510) or channel decoder (520) may also include other elements (not shown), e.g., for FEC decoding and analog signal demodulation.

The coded data (521) that is output from the channel decoder (520) is stored in a temporary coded data area (530) until a sufficient quantity of such data has been received. The coded data (521) includes coded pictures (531) and MMCO/RPS information (532). The coded data (521) in the coded data area (530) contain, as part of the syntax of an elementary coded video bitstream, coded data for one or more pictures. The coded data (521) in the coded data area (530) can also include media metadata relating to the encoded video data (e.g., as one or more parameters in one or more SEI messages or VUI messages).

In general, the coded data area (530) temporarily stores coded data (521) until such coded data (521) is used by the video decoder (550). At that point, coded data for a coded picture (531) and MMCO/RPS information (532) are transferred from the coded data area (530) to the video decoder (550). As decoding continues, new coded data is added to the coded data area (530) and the oldest coded data remaining in the coded data area (530) is transferred to the video decoder (550).

Figure 6:
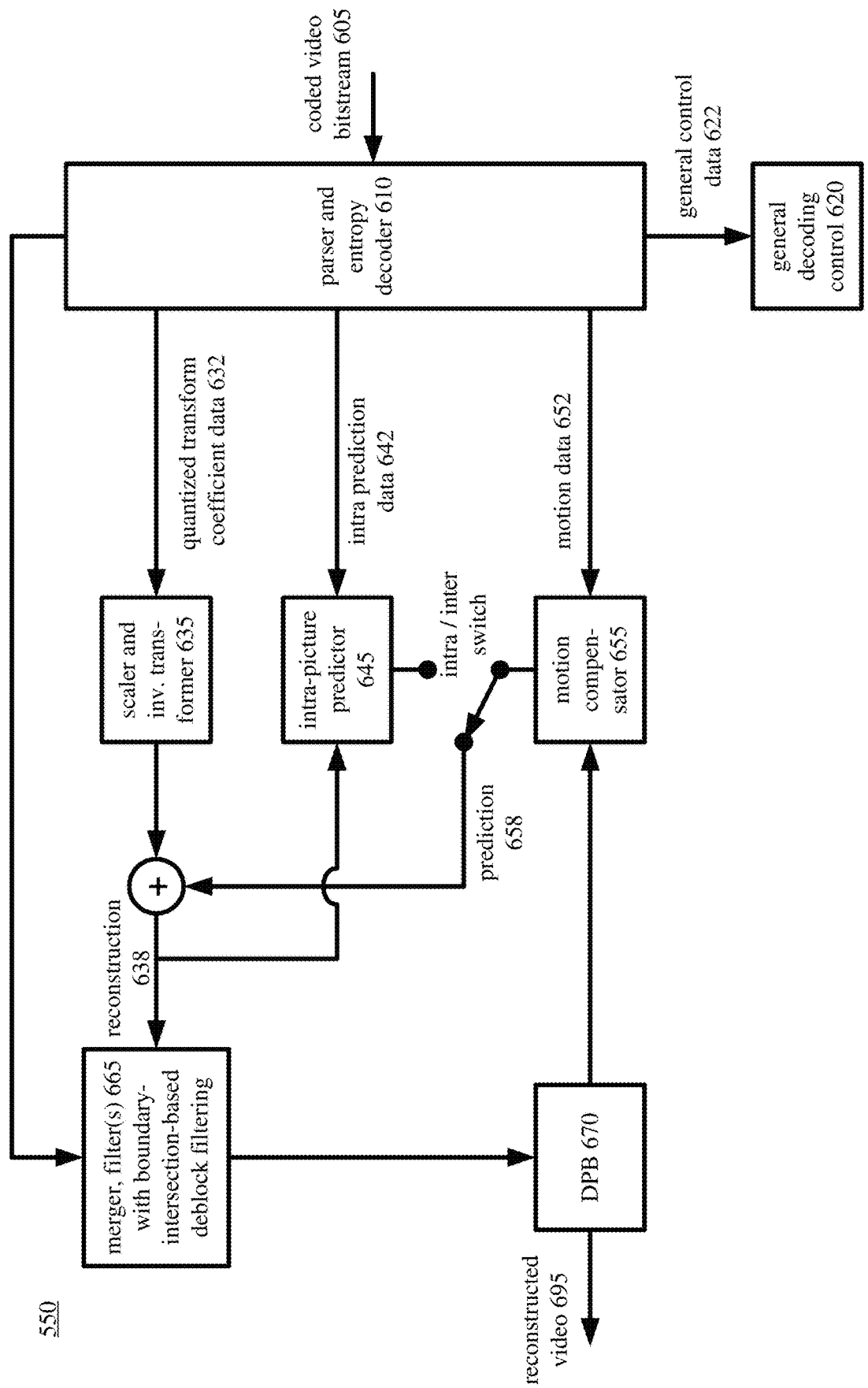
FIG. 6 is a diagram illustrating an example video decoder, in conjunction with which some described embodiments can be implemented.

The video decoder (550) decodes a coded picture (531) to produce a corresponding decoded picture (551). As shown in FIG. 6, the video decoder (550) receives the coded picture (531) as input as part of a coded video bitstream (605), and the video decoder (550) produces the corresponding decoded picture (551) as output as reconstructed video (695).

Generally, the video decoder (550) includes multiple decoding modules that perform decoding tasks such as entropy decoding, inverse quantization, inverse frequency transforms, motion compensation, intra-picture prediction, and filtering. Many of the components of the decoder (550) are used for both intra-picture decoding and inter-picture decoding. The exact operations performed by those components can vary depending on the type of information being decompressed. The format of the coded video bitstream (605) can be an extension or variation of Windows Media Video format, SMPTE 421M format, MPEG-x format (e.g., MPEG-1, MPEG-2, or MPEG-4), H.26x format (e.g., H.261, H.262, H.263, H.264, H.265), or VPx format, or another format.

A picture can be organized into multiple tiles of the same size or different sizes. A picture can also be organized as one or more slices. The content of a slice or tile can be further organized as blocks or other sets of sample values. Blocks may be further sub-divided at different stages. For example, a picture can be divided into 64×64 blocks, 32×32 blocks or 16×16 blocks, which can in turn be divided into smaller blocks of sample values. In implementations of decoding for the H.264/AVC standard, for example, a picture is divided into MBs and blocks. In implementations of decoding for the H.265/HEVC standard, for example, a picture is split into CTUs (CTBs), CUs (CBs), PUs (PBs) and TUs (TBs).

With reference to FIG. 6, a buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the video encoder (340) (e.g., context-adaptive binary arithmetic decoding with binarization using Exponential-Golomb or Golomb-Rice). As a result of parsing and entropy decoding, the parser/entropy decoder (610) produces general control data (622), quantized transform coefficient data (632), intra prediction data (642) (e.g., intra-picture prediction modes), motion data (652), and filter control data (662).

The general decoding control (620) receives the general control data (622). The general decoding control (620) provides control signals (not shown) to other modules (such as the scaler/inverse transformer (635), intra-picture predictor (645), motion compensator (655), and intra/inter switch) to set and change decoding parameters during decoding.

With reference to FIG. 5, as appropriate, when performing its decoding process, the video decoder (550) may use one or more previously decoded pictures (569) as reference pictures for inter-picture prediction. The video decoder (550) reads such previously decoded pictures (569) from a decoded picture temporary memory storage area (560), which is, for example, DPB (670).

With reference to FIG. 6, if the current picture is predicted using inter-picture prediction, a motion compensator (655) receives the motion data (652), such as MV data, reference picture selection data and merge mode index values. The motion compensator (655) applies MVs to the reconstructed reference picture(s) from the DPB (670). The motion compensator (655) produces motion-compensated predictions for inter-coded blocks of the current picture.

In a separate path within the video decoder (550), the intra-picture predictor (645) receives the intra prediction data (642), such as information indicating the prediction mode/direction used. For intra spatial prediction, using values of a reconstruction (638) of the current picture, according to the prediction mode/direction, the intra-picture predictor (645) spatially predicts sample values of a current block of the current picture from previously reconstructed sample values of the current picture. Or, for intra block copy mode, the intra-picture predictor (645) predicts the sample values of a current block using previously reconstructed sample values of a reference block, which is indicated by an offset (block vector) for the current block.

The intra/inter switch selects values of a motion-compensated prediction or intra-picture prediction for use as the prediction (658) for a given block. For example, when H.265/HEVC syntax is followed, the intra/inter switch can be controlled based on a syntax element encoded for a CU of a picture that can contain intra-predicted CUs and inter-predicted CUs. When residual values have been encoded/signaled, the video decoder (550) combines the prediction (658) with reconstructed residual values to produce the reconstruction (638) of the content from the video signal. When residual values have not been encoded/signaled, the video decoder (550) uses the values of the prediction (658) as the reconstruction (638).

The video decoder (550) also reconstructs prediction residual values. To reconstruct the residual when residual values have been encoded/signaled, the scaler/inverse transformer (635) receives and processes the quantized transform coefficient data (632). In the scaler/inverse transformer (635), a scaler/inverse quantizer performs inverse scaling and inverse quantization on the quantized transform coefficients. The scaler/inverse transformer (635) sets values for QP for a picture, tile, slice and/or other portion of video based on syntax elements in the bitstream. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values. The video decoder (550) combines reconstructed prediction residual values with prediction values of the prediction (658), producing values of the reconstruction (638).

For intra-picture prediction, the values of the reconstruction (638) can be fed back to the intra-picture predictor (645). For inter-picture prediction, the values of the reconstruction (638) can be further filtered. In the merger/filter(s) (665), the video decoder (550) merges content from different tiles into a reconstructed version of the picture. The video decoder (550) selectively performs deblock filtering and SAO filtering according to the filter control data (662) and rules for filter adaptation, so as to adaptively smooth discontinuities across boundaries in the pictures. In particular, the deblock filtering can include boundary-intersection-based deblock filtering as described below. Other filtering (such as de-ringing filtering or ALF; not shown) can alternatively or additionally be applied. Tile boundaries can be selectively filtered or not filtered at all, depending on settings of the video decoder (550) or a syntax element within the encoded bitstream data. The DPB (670) buffers the reconstructed current picture for use as a reference picture in subsequent motion-compensated prediction.

The video decoder (550) can also include a post-processing filter. The post-processing filter can perform deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter is applied to reconstructed sample values outside of the motion compensation loop, before output for display.

With reference to FIG. 5, the decoded picture temporary memory storage area (560) includes multiple picture buffer storage areas (561, 562, . . . , 56n). The decoded picture storage area (560) is, for example, the DPB (670). The decoder (550) uses the MMCO/RPS information (532) to identify a picture buffer (561, 562, etc.) in which it can store a decoded picture (551). The decoder (550) stores the decoded picture (551) in that picture buffer. The decoder (550) also determines whether to remove any reference pictures from the multiple picture buffer storage areas (561, 562, . . . , 56n).

An output sequencer (580) identifies when the next picture to be produced in display order (also called output order) is available in the decoded picture storage area (560). When the next picture (581) to be produced in display order is available in the decoded picture storage area (560), it is read by the output sequencer (580) and output to the output destination (590) (e.g., display). In general, the order in which pictures are output from the decoded picture storage area (560) by the output sequencer (580) (display order) may differ from the order in which the pictures are decoded by the decoder (550) (bitstream order).

Depending on implementation and the type of decompression desired, modules of the video decoder system (500) and/or video decoder (550) can be added, omitted, split into multiple modules, combined with other modules, and/or replaced with like modules. In alternative embodiments, decoder systems or decoders with different modules and/or other configurations of modules perform one or more of the described techniques. Specific embodiments of decoder systems typically use a variation or supplemented version of the video decoder system (500). Specific embodiments of video decoders typically use a variation or supplemented version of the video decoder (550). The relationships shown between modules within the video decoder system (500) and video decoder (550) indicate general flows of information in the video decoder system (500) and video decoder (550), respectively; other relationships are not shown for the sake of simplicity. In general, a given module of the video decoder system (500) or video decoder (550) can be implemented by software executable on a CPU, by software controlling special-purpose hardware (e.g., graphics hardware for video acceleration), or by special-purpose hardware (e.g., in an ASIC).

V. Boundary-Intersection-Based Deblock Filtering.

This section describes various features of boundary-intersection-based deblock filtering. For the boundary-intersection-based deblock filtering, when filtering sample values at a block-boundary intersection between four blocks of a reconstructed picture, a video encoder or video decoder can evaluate characteristics of all four blocks and adjust sample values in a vertical line between horizontally adjacent blocks, in a horizontal line between vertically adjacent blocks, and/or in a diagonal line between diagonally adjacent blocks across the block-boundary intersection. Compared to previous, boundary-based deblock filtering approaches, when there is a large visual difference between sample values at corner positions of two diagonally adjacent blocks, the difference can be smoothed by filtering sample values in a diagonal line across the block-boundary intersection. Boundary-intersection-based deblock filtering can improve the quality of motion-compensated prediction that uses the reconstructed picture after the filtering, especially when one or more of the blocks at the block-boundary intersection is not coded (e.g., lacks non-zero transform coefficients in the bitstream).

A. Examples of Boundary-Based Deblock Filtering.

In previous, boundary-based deblock filtering approaches, sample values across certain horizontal boundaries and across certain vertical boundaries between blocks/sub-blocks are selectively filtered, depending on various factors. Sample values in a diagonal line across a block-boundary intersection between diagonally adjacent blocks are not filtered, even if there is a large difference in the sample values. This can cause noticeable distortion at the corners of blocks, which may hurt the efficiency of motion-compensated prediction.

FIG. 7 shows an example (700) of boundary-based deblock filtering with this problem. FIG. 7 shows a non-skipped block (710) and three skipped blocks (720, 730, 740). Each of the blocks (710, 720, 730, 740) is a 4×4 arrangement of sample values. For the non-skipped block (710), the bitstream includes encoded data for at least one non-zero transform coefficient. For each of the skipped blocks (720, 730, 740), the bitstream includes no coded data for non-zero transform coefficients. In the example (700) of FIG. 7, filtering decisions are made based on the skipped/not skipped status of the respective blocks. In particular, sample values across a boundary between a non-skipped block and skipped block may be filtered, but sample values across a boundary between two skipped blocks are not filtered. (It is assumed that other factors such as MV values, reference pictures used, etc. indicate filtering may or may not be performed at block boundaries, depending on the skipped/not skipped status of the respective blocks.)

The non-skipped block (710) includes multiple sample values that may be deblock filtered. The potentially filtered sample values are shaded in FIG. 7. Two skipped blocks (720, 730) also include potentially filtered sample values, which are shown as shaded, as well as unfiltered sample values, some of which are shown. The other skipped block (740) includes only unfiltered sample values. Sample values across the vertical boundary (750) between the non-skipped block (710) and horizontally adjacent skipped block (720) may be filtered horizontally. Similarly, sample values across the horizontal boundary (760) between the non-skipped block (710) and vertically adjacent skipped block (730) may be filtered vertically. Sample values (780, 790) diagonally across the block-boundary intersection between the non-skipped block (710) and skipped block (740) are not filtered, however, even if the sample values (780, 790) have a large difference in values, e.g., due to distortion at the corner position of the skipped block (740) and/or corner position of the non-skipped block (710). Also, in this case, there is no filtering between sample values of the skipped blocks (720, 730, 740) across the vertical boundary (750) or horizontal boundary (760).

B. Examples of Boundary-Intersection-Based Deblock Filtering.

FIGS. 8*a*-8*e* show various examples (801-805) of boundary-intersection-based deblock filtering with different configurations of skipped blocks and non-skipped blocks. In some cases, overall deblock filtering behavior is partially or entirely the same as with boundary-based deblock filtering. In other cases, however, boundary-intersection-based deblock filtering affects sample values in different ways.

In the examples (801-805) of FIGS. 8*a*-8*e*, filtering decisions are made based on the skipped/not skipped status of the respective blocks, which are 4×4 arrangements of sample values. For a non-skipped block, the bitstream includes coded data for at least one non-zero transform coefficient. For a skipped block, the bitstream lacks coded data for non-zero transform coefficients. Sample values across a block boundary between a non-skipped block and skipped block may be filtered, but sample values across a block boundary between two skipped blocks are not filtered. As in the example (700) of FIG. 7, it is assumed that other factors such as MV values, reference pictures used, etc. indicate filtering may or may not be performed at block boundaries, depending on the skipped/not skipped status of the respective blocks.

FIG. 8*a* shows a first example (801) of boundary-intersection-based deblock filtering, which involves a non-skipped block (811) and three skipped blocks (820, 830, 840) that meet at a block-boundary intersection. As in the example (700) of FIG. 7, sample values across the vertical boundary (850) between the non-skipped block (811) and horizontally adjacent skipped block (820) may be filtered horizontally, and sample values across the horizontal boundary (860) between the non-skipped block (811) and vertically adjacent skipped block (830) may be filtered vertically. Sample values across a block boundary between two adjacent skipped blocks are not filtered. Unlike the example (700) of FIG. 7, sample values (880, 890) diagonally across the block-boundary intersection between the non-skipped block (811) and skipped block (840) may be filtered along a diagonal gradient. This filtering can mitigate large difference between the sample values (880, 890) that are due to distortion.

In FIG. 8*a*, the non-skipped block (811) is in the top-left block position at the block-boundary intersection between four blocks. The behavior of deblock filtering is analogous if the single non-skipped block is in any of the other three block positions (top-right, bottom-right, or bottom-left).

Figure 8B:
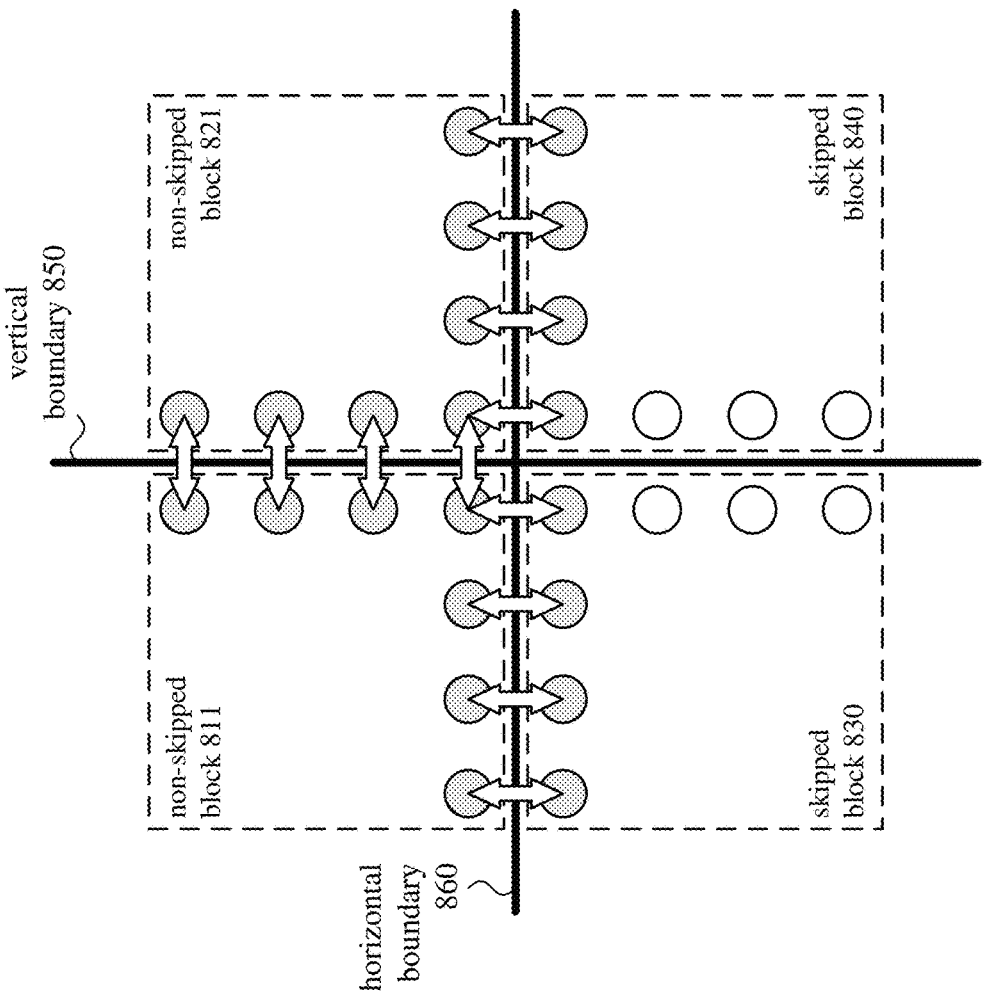

FIG. 8*b* shows a second example (802) of boundary-intersection-based deblock filtering, which involves two non-skipped blocks (811, 821) and two skipped blocks (830, 840) that meet at a block-boundary intersection. Sample values across the vertical boundary (850) between the two non-skipped blocks may be filtered horizontally. Sample values across the horizontal boundary (860) between a non-skipped block and vertically adjacent skipped block may be filtered vertically. Sample values across a block boundary between two adjacent skipped blocks are not filtered. For the configuration of blocks shown in FIG. 8*b*, the overall behavior of the deblock filtering is the same as conventional boundary-based deblock filtering. The behavior of deblock filtering is analogous if the two non-skipped blocks are both left of the block-boundary intersection, both below the block-boundary intersection, or both right of the block-boundary intersection.

Figure 8C:
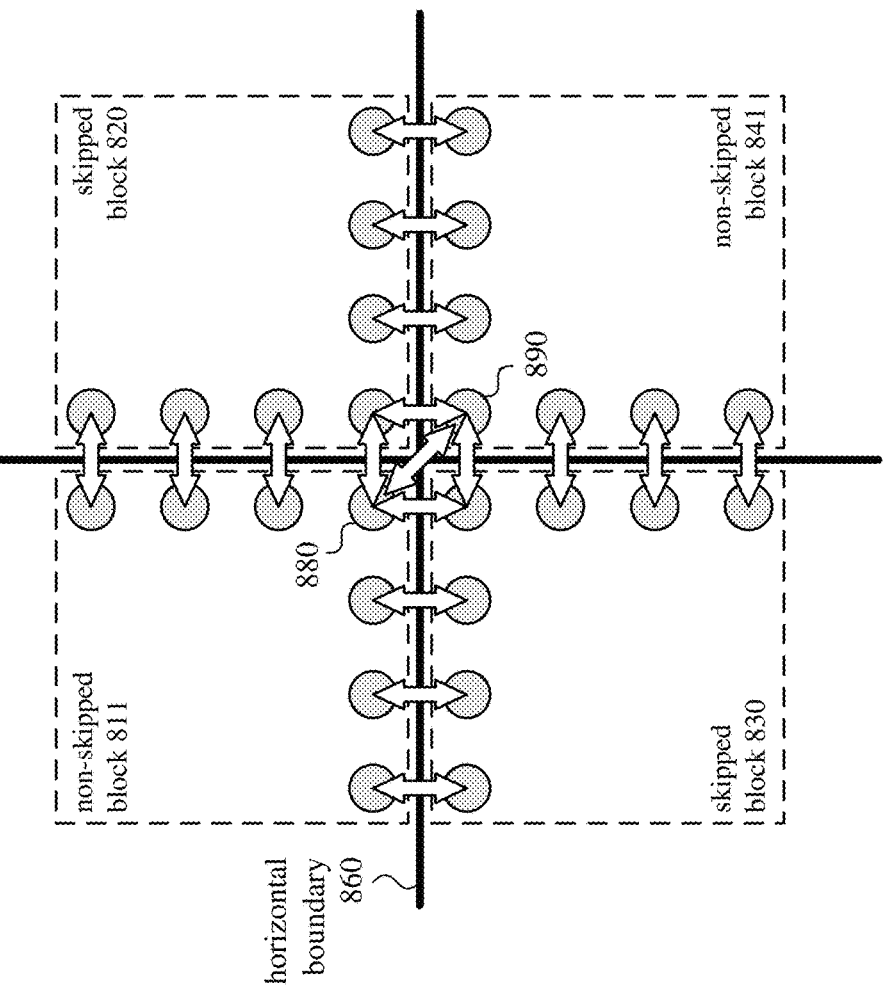

FIG. 8*c* shows a third example (803) of boundary-intersection-based deblock filtering, which involves two non-skipped blocks (811, 841) alternating with two skipped blocks (820, 830), with the four blocks meeting at a block-boundary intersection. Sample values across the vertical boundary (850) between a non-skipped block and horizontally adjacent skipped block may be filtered horizontally. Sample values across the horizontal boundary (860) between a non-skipped block and vertically adjacent skipped block may be filtered vertically. In addition, sample values (880, 890) diagonally across the block-boundary intersection between the two diagonally adjacent non-skipped blocks (811, 841) may be filtered along a diagonal gradient. The behavior of deblock filtering is analogous if the non-skipped blocks are in the top-right and bottom-left block positions.

FIG. 8*d* shows a fourth example (804) of boundary-intersection-based deblock filtering, which involves three non-skipped blocks (811, 821, 841) and a skipped block (830) that meet at a block-boundary intersection. Sample values across the vertical boundary (850) between a non-skipped block and horizontally adjacent block, whether skipped or not skipped, may be filtered horizontally. Sample values across the horizontal boundary (860) between a non-skipped block and vertically adjacent block, whether skipped or not skipped, may be filtered vertically. For the configuration of blocks shown in FIG. 8*d*, the overall behavior of the deblock filtering is the same as conventional boundary-based deblock filtering. The behavior of deblock filtering is analogous if the skipped block is in the top-left block position, top-right block position, or bottom-right block position.

Finally, FIG. 8*e* shows a fifth example (805) of boundary-intersection-based deblock filtering, which involves four non-skipped blocks (811, 821, 831, 841) that meet at a block-boundary intersection. Sample values across the vertical boundary (850) between two horizontally adjacent non-skipped blocks may be filtered horizontally, and sample values across the horizontal boundary (860) between two vertically adjacent non-skipped blocks may be filtered vertically. For the configuration of blocks shown in FIG. 8*e*, the overall behavior of the deblock filtering is the same as conventional boundary-based deblock filtering.

In summary, for the examples (801-805) shown in FIGS. 8*a*-8*e*, when a non-skipped block is horizontally adjacent to a skipped block and vertically adjacent to a skipped block, sample values in a diagonal line between the non-skipped block and a diagonally adjacent block across a block-boundary intersection may be filtered. In this situation, the sample values at corner positions of the non-skipped block and diagonally adjacent block can be selectively adjusted to mitigate distortion. Alternatively, filtering along a diagonal gradient can be performed in other and/or additional configurations (e.g., between diagonally adjacent blocks in the configuration shown in FIG. 8*d*).

In the examples (801, 803) shown in FIGS. 8*a* and 8*c*, sample values in a single diagonal line across a block-boundary intersection are selectively filtered. FIG. 9 shows an alternative example (900) of boundary-intersection-based deblock filtering. In most respects, the example (900) shown in FIG. 9 is the same as the example (801) shown in FIG. 8*a*. In FIG. 9, however, sample values in multiple lines diagonally across the block-boundary intersection between the non-skipped block (811) and skipped block (840) may be filtered along diagonal gradients.

C. Techniques for Boundary-Intersection-Based Deblock Filtering.

Figure 10:
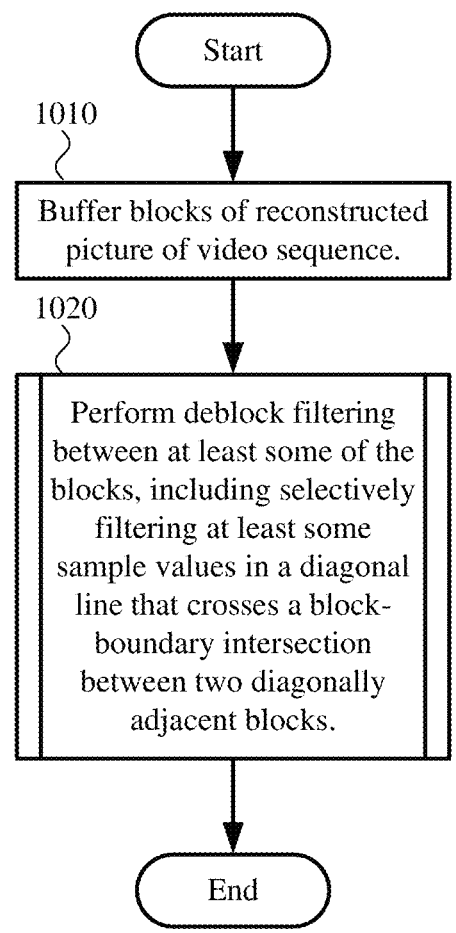
FIG. 10 is a flowchart illustrating a generalized technique for boundary-intersection-based deblock filtering during video encoding or video decoding.

FIG. 10 shows a generalized technique (1000) for boundary-intersection-based deblock filtering during video encoding or video decoding. A video encoder as described with reference to FIGS. 3, 4*a*, and 4*b*, or other video encoder, can perform the technique (1000). Or, a video decoder as described with reference to FIGS. 5 and 6, or other video decoder, can perform the technique (1000).

To start, the video encoder/decoder buffers (1010) multiple blocks of a reconstructed picture of a video sequence. For example, the multiple blocks are buffered in a DPB.

The video encoder/decoder performs (1020) deblock filtering between at least some of the multiple blocks. As part of the deblock filtering, the video encoder/decoder selectively filters at least some sample values in a diagonal line that crosses a block-boundary intersection between two diagonally adjacent blocks among the multiple blocks. The video encoder/decoder can also selectively filter one or more other lines of sample values (e.g., horizontally and/or vertically), as described below. FIG. 11 shows an example technique (1100) for applying boundary-intersection-based deblock filtering to sample values of blocks of a reconstructed picture. The video encoder/decoder can perform such boundary-intersection-based deblock filtering on a block-by-block basis within a picture or within some smaller portion of a picture (e.g., tile, slice, CTB).

With reference to FIG. 11, the video encoder/decoder first filters horizontally across vertical boundaries in the reconstructed picture (or tile, slice, CTB, etc.). The video encoder/decoder gets (1110) a current block among the multiple blocks of the picture. Initially, the current block is the first block of the picture (or tile, slice, CTB, etc.). Subsequently, the current block is a next block of the picture (or tile, slice, CTB, etc.).

The video encoder/decoder evaluates (1112) one or more characteristics of the current block and one or more characteristics of a neighboring block, which is horizontally adjacent the current block. The characteristic(s) that are evaluated can include a count of non-zero transform coefficients per block, a value of a MV per block, and/or a reference picture used in motion compensation per block. Or, the characteristic(s) that are evaluated for a given block can include skipped/not-skipped status. Alternatively, one or more other and/or additional characteristics are evaluated for the respective blocks.

The video encoder/decoder selectively filters (1114) at least some sample values in each of multiple horizontal lines that cross a vertical boundary between the current block and the neighboring, horizontally adjacent block. For a horizontal line, the selective filtering (1114) depends at least in part on the sample values in the horizontal line, and it can affect one or more sample values in the horizontal line in each of the two horizontally adjacent blocks. Section V.D describes examples of filtering rules and filter coefficients that can be used in the selective filtering (1114).

The video encoder/decoder checks (1116) whether to continue the horizontal filtering for the next block in the reconstructed picture (or tile, slice, CTB, etc.). If so, the video encoder/decoder gets (1110) the next block as the current block. In not (horizontal filtering is finished), the video encoder/decoder begins filtering vertically across horizontal boundaries in the picture (or tile, slice, CTB, etc.).

For the vertical filtering, the video encoder/decoder gets (1120) a current block among the multiple blocks of the reconstructed picture. Initially, the current block is the first block of the picture (or tile, slice, CTB, etc.). Subsequently, the current block is a next block of the picture (or tile, slice, CTB, etc.).

The video encoder/decoder evaluates (1122) one or more characteristics of the current block and one or more characteristics of a neighboring block, which is vertically adjacent the current block. The characteristic(s) that are evaluated can be the same as the characteristic(s) evaluated (1112) during horizontal filtering.

The video encoder/decoder selectively filters (1124) at least some sample values in each of multiple vertical lines that cross a horizontal boundary between the current block and the neighboring, vertically adjacent block. For a vertical line, the selective filtering (1124) depends at least in part on the sample values in the vertical line, and it can affect one or more sample values in the vertical line in each of the two vertically adjacent blocks. Section V.D describes examples of filtering rules and filter coefficients that can be used in the selective filtering (1124).

The video encoder/decoder checks (1126) whether to continue the vertical filtering for the next block in the reconstructed picture (or tile, slice, CTB, etc.). If so, the video encoder/decoder gets (1120) the next block as the current block. In not (vertical filtering is finished), the video encoder/decoder begins filtering diagonally across block-boundary intersections in the picture (or tile, slice, CTB, etc.).

The video encoder/decoder gets (1130) a current block among the multiple blocks of the reconstructed picture. Initially, the current block is the first block of the picture (or tile, slice, CTB, etc.). Subsequently, the current block is a next block of the picture (or tile, slice, CTB, etc.).

The video encoder/decoder optionally evaluates (1132) one or more characteristics of the current block and one or more characteristics of a neighboring block, which is diagonally adjacent the current block. The characteristic(s) that are evaluated can be the same as the characteristic(s) evaluated (1112) during horizontal filtering. Alternatively, the video encoder/decoder can make decisions about deblock filtering between the current block and neighboring, diagonally adjacent block only by evaluating characteristic(s) of the current block, horizontally adjacent block, and vertically adjacent block.

The video encoder/decoder selectively filters (1134) at least some sample values in each of one or more diagonal lines that cross the block-boundary intersection between the current block and the neighboring, diagonally adjacent block. In particular, in some example implementations, when the current block is not skipped but its horizontally and vertically adjacent neighboring blocks are skipped, the video encoder/decoder performs the selective filtering (1134) along diagonal line(s) with the diagonally adjacent neighboring block. For the diagonal filtering, a diagonal line can have an angle of, for example, 45 degrees or 135 degrees. Alternatively, the diagonal line follows some other diagonal gradient. For a diagonal line, the selective filtering (1134) depends at least in part on the sample values in the diagonal line, and it can affect one or more sample values in the diagonal line in each of the two diagonally adjacent blocks. When the video encoder/decoder applies diagonal filtering along multiple diagonal lines, the multiple diagonal lines can be parallel lines. Section V.D describes examples of filtering rules and filter coefficients that can be used in the selective filtering (1134).

The video encoder/decoder checks (1136) whether to continue the diagonal filtering for the next block in the reconstructed picture (or tile, slice, CTB, etc.). If so, the video encoder/decoder gets (1130) the next block as the current block. In not (diagonal filtering is finished), the video encoder/decoder finishes the deblock filtering (1100).

Alternatively, the video encoder/decoder performs (1020) boundary-intersection-based deblock filtering in some other way. For example, the video encoder/decoder can perform boundary-intersection-based deblock filtering on a sample-by-sample basis for a reconstructed picture. For a given sample value of a current block among the multiple blocks of the reconstructed picture, the video encoder/decoder checks if the given sample value is not adjacent any block boundary between the current block and a neighboring block. If the given sample value is not adjacent any block boundary between the current block and a neighboring block, the video encoder/decoder skips the deblock filtering for the given sample value. Otherwise, the video encoder/decoder checks if the given sample value is adjacent a single block boundary between the current block and a single neighboring block. If so (that is, the given sample value is adjacent a single block boundary between the current block and a single neighboring block), the video encode/decoder evaluates one or more characteristics of the current block and single neighboring block (horizontally neighboring block or vertically neighboring block) and selectively filters at least some sample values in a horizontal or vertical line between the current block and single neighboring block. Otherwise (that is, the given sample value is adjacent a block-boundary intersection between the current block and three neighboring blocks), the video encoder/decoder evaluates one or more characteristics of the current block and three neighboring blocks (horizontally adjacent block, vertically adjacent block, and diagonally adjacent block) and selectively filters at least some sample values in the current block and three neighboring blocks (e.g., filtering in a horizontal line, vertical line, and/or diagonal line). The video encoder/decoder checks whether to continue for another sample value in the reconstructed picture and, if so, continues by evaluating that sample value as the given sample value. Alternatively, the video encoder/decoder can check possible positions of the given sample value (i.e., whether the given sample value is on no block boundary, a single block boundary, or two block boundaries) in some other order.

Returning to FIG. 10, after the deblock filtering of the reconstructed picture, the video encoder/decoder can use the reconstructed picture, including filtered sample values, as a reference picture during motion compensation for a subsequent picture in the video sequence.

D. Example Filtering Rules and Filters.

The filtering rules applied in boundary-intersection-based deblock filtering depend on implementation. Other aspects of filtering (e.g., filter taps, filter strengths) also depend on implementation.

In general, boundary-intersection-based deblock filtering uses different variations of filters, which are selectively applied across block boundaries and block-boundary intersections depending on filtering rules. The filtering rules can consider factors such as counts of non-zero transform coefficients in blocks adjacent the block boundary/block-boundary intersection, reference pictures used for motion compensation in blocks adjacent the block boundary/block-boundary intersection, MVs used for motion compensation in blocks adjacent the block boundary/block-boundary intersection, and skipped/not skipped status of blocks adjacent the block boundary/block-boundary intersection.

In some example implementations, for boundary-intersection-based deblock filtering, a video encoder/decoder applies filtering rules and filters based on the deblock filtering rules and filters of the H.265 standard. The boundary-intersection-based deblock filtering is applied at block boundaries/intersections of prediction blocks ("PBs") or transform blocks ("TBs") that align with block boundaries/intersections on an 8×8 grid. A given block of sample values, considered for deblock filtering, can have an associated TB, which provided residual values, and an associated PB, which provided prediction values. The associated TB and PB can have the same size, such that TB boundaries are the same as PB boundaries. Or, the associated TB and PB can have different sizes, such that TB boundaries are different than PB boundaries, in which case deblock filtering may be performed at a TB boundary, PB boundary, or joint TB/PB boundary. Block boundaries and block-boundary intersections of smaller blocks (e.g., 8×4, 4×8, 4×4) that do not align with block boundaries/intersections of the 8×8 grid are not deblock filtered. The video encoder/decoder performs horizontal deblock filtering across vertical boundaries in a reconstructed picture (or tile, slice, CTB, etc.), then performs vertical deblock filtering across horizontal boundaries in the picture (or tile, slice, CTB, etc.), and then performs diagonal filtering across block-boundary intersections in the picture (or tile, slice, CTB, etc.).

Figure 12A:
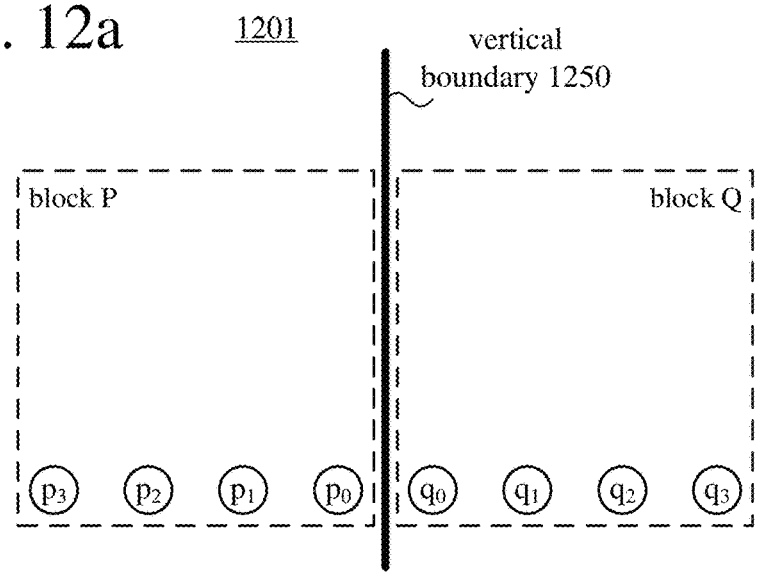
Figure 12B:
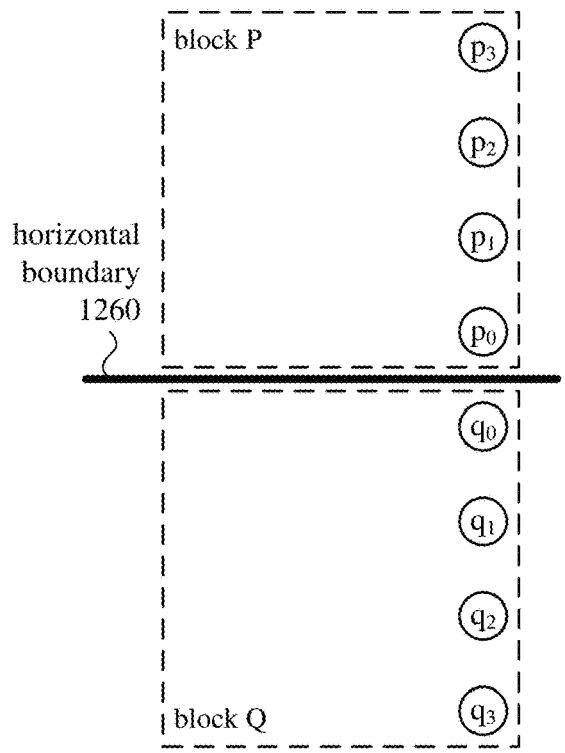

For the boundary-intersection-based deblock filtering, the video encoder/decoder uses filtering rules from the H.265 standard to decide whether to filter sample values between two horizontally adjacent blocks (P and Q) or two vertically adjacent blocks (P and Q). Similar filtering rules are used to decide whether to filter sample values in a diagonal line across a block-boundary intersection between two diagonally adjacent blocks (P and Q). FIGS. 12a, 12b, and 12c show examples (1201, 1202, 1203) of sample values evaluated and, in some cases, adjusted in deblock filtering operations. FIG. 12a shows two horizontally adjacent blocks P and Q separated by a vertical boundary (1250). Block P includes four sample values $p_0$, $p_1$, $p_2$, and $p_3$ in a horizontal line with four sample values $q_0$, $q_1$, $q_2$, and $q_3$ of block Q. The sample values closest to the vertical boundary (1250) are $p_0$ and $q_0$, followed by sample values $p_1$ and $q_1$, and so on. FIG. 12b shows two vertically adjacent blocks P and Q separated by a horizontal boundary (1260). Block P includes four sample values $p_0$, $p_1$, $p_2$, and $p_3$ in a vertical line with four sample values $q_0$, $q_1$, $q_2$, and $q_3$ of block Q. The sample values closest to the horizontal boundary (1260) are $p_0$ and $q_0$, followed by sample values $p_1$ and $q_1$, and so on. FIG. 12c shows two diagonally adjacent blocks P and Q separated by a block-boundary intersection (1270). Block P includes four sample values $p_0$, $p_1$, $p_2$, and $p_3$ in a diagonal line with four sample values $q_0$, $q_1$, $q_2$, and $q_3$ of block Q. The sample values closest to the block-boundary intersection (1270) are $p_0$ and $q_0$, followed by sample values $p_1$ and $q_1$, and so on.

Whether filtering horizontally, vertically, or diagonally between adjacent blocks P and Q, a filter strength of 0, 1 or 2 is assigned. If at least one of the blocks P and Q is intra-coded, the filter strength is 2. Otherwise (that is, blocks P and Q are inter-coded), the filter strength is 1 if at least one of the following conditions is satisfied: (1) at least one of blocks P and Q (specifically, their associated TBs) has at least one non-zero transform coefficient; (2) different reference pictures are associated with blocks P and Q (specifically, their associated PBs); (3) blocks P and Q (specifically, their associated PBs) have different numbers of MVs; and (4) for blocks P and Q (specifically, their associated PBs), the difference between horizontal MV components or vertical MV components is greater than a threshold amount (e.g., one sample value). If none of the conditions is satisfied, the filter strength is 0, which means no boundary-intersection-based deblock filtering is applied to sample values between blocks P and Q.

Based on the filter strength and an average QP value for adjacent blocks P and Q (which may be horizontally adjacent, vertically adjacent, or diagonally adjacent), the video encoder/decoder determines two thresholds $t_c$ and $\beta$ for filtering of luma sample values. For horizontal or vertical filtering of luma sample values, the video encoder/decoder evaluates luma sample values in the first and fourth lines at a block boundary. For diagonal filtering, the video encoder/decoder evaluates luma sample values in a middle line through a block-boundary intersection. Within a line of luma sample values, the video encoder/decoder calculates a first intra-block difference measure for sample values within block P (e.g., the absolute value of $p_2-2*p_1+p_0$), a second intra-block difference measure for sample values within block Q (e.g., the absolute value of $q_2-2*q_1+q_0$), and an inter-block difference measure for sample values across the block boundary/intersection (e.g., combining the two intra-block difference measures). For horizontal or vertical filtering, the video encoder/decoder can calculate other, aggregate difference measures for the multiple lines evaluated. The video encoder/decoder evaluates selected luma sample values within a line, the inter-block difference measure, and thresholds $t_c$ and $\beta$ to decide whether to deblock filter luma sample values in the line. Based on the decisions for the line(s) across a block boundary/intersection, the video encoder/decoder determines whether to use strong filtering, weak filtering, or no filtering across the block boundary/intersection. If weak filtering is used, the video encoder/decoder also determines whether to adjust a single luma sample value or multiple luma sample values per block.

The video encoder/decoder then filters luma sample values in lines across the block boundary/block-boundary intersection between adjacent blocks (P and Q). For example, when strong filtering is used, the video encoder/decoder filters three luma sample values per block in a given line, using variations of lowpass filtering and clipping the results to be within a range defined using the threshold $t_c$:

$$p_0'=\text{Clip3}(p_0-2*t_c,p_0+2*t_c,(p_2+2*p_1+2*p_0+2*q_0+q_1+4)>>3),$$

$$p_1'=\text{Clip3}(p_1-2*t_c,p_1+2*t_c,(p_2+p_1+p_0+q_0+2)>>2),$$

$$p_2'=\text{Clip3}(p_2-2*t_c,p_2+2*t_c,(2*p_3+3*p_2+p_1+p_0+q_0+4)>>3),$$

$$q_0'=\text{Clip3}(q_0-2*t_c,q_0+2*t_c,(p_1+2*p_0+2*q_0+2*q_1+q_2+4)>>3),$$

$$q_1'=\text{Clip3}(q_1-2*t_c,q_1+2*t_c,(p_0+q_0+q_1+q_2+2)>>2), \text{ and}$$

$$q_2'=\text{Clip3}(q_2-2*t_c,q_2+2*t_c,(p_0+q_0+q_1+3*q_2+2*q_3+4)>>3),$$

where the function Clip3(a, b, c) clips c to fall within the range of a and b, inclusive. In some implementations, strong filtering may be used horizontally or vertically, but not diagonally. Instead, at most weak filtering is used on sample values in a diagonal line between diagonally adjacent blocks.

When weak filtering is used on luma sample values in a given line across the block boundary/block-boundary intersection between adjacent blocks (P and Q), the video encoder/decoder calculates an offset measure Δ based on luma sample values in the given line on different sides of the block boundary/intersection:

$$\Delta=(9*(q_0-p_0)-3*(q_1-p_1)+8)>>4).$$

If the absolute value of the offset measure is less than a threshold (e.g., $10*t_c$), the video encoder/decoder clips the offset measure to be within a range defined using the threshold $t_c$ and adjusts the luma sample values ($p_0$ and $q_0$) nearest to the block boundary/intersection:

$$\Delta=\text{Clip3}(-t_c,t_c,\Delta),$$

$$p_0'=\text{Clip1}_Y(p_0+\Delta), \text{ and}$$

$$q_0'=\text{Clip1}_Y(q_0+\Delta),$$

where the function $\text{Clip1}_Y(a)$ clips a to be between 0 and the maximum value possible for a luma sample value, inclusive. For weak filtering, depending on earlier decisions, the video encoder/decoder can also adjust the next closest luma sample value in block P and/or block Q:

$$\Delta p=\text{Clip3}(-(t_c-1),t_c>>1,(((p_2+p_0+1)>>1)-p_1+\Delta)>>1),$$

$$p_1'=\text{Clip1}_Y(p_1+\Delta p),$$

$$\Delta q=\text{Clip3}(-(t_c>>1),t_c>>1,(((q_2+q_0+1)>>1)-q_1-\Delta)>>1), \text{ and}$$

$$q_1'=\text{Clip1}_Y(q_1+\Delta q).$$

Deblock filtering of chroma sample values is much simpler. Based on an average QP value for adjacent blocks P and Q (which may be horizontally adjacent, vertically adjacent, or diagonally adjacent), the video encoder/decoder determines a threshold $t_c$ for filtering of chroma sample values. The video encoder/decoder then filters chroma sample values in lines across the block boundary/block-boundary intersection between adjacent blocks (P and Q). For example, the video encoder/decoder calculates an offset measure Δ based on chroma sample values in the given line on different sides of the block boundary/block-boundary intersection:

$$\Delta=\text{Clip3}(-t_c,t_c,((((q_0-p_0)<<2)+p_1-q_1+4)>>3)).$$

Thus, the offset measure is clipped to be within a range defined using the threshold $t_c$. The video encoder/decoder adjusts the chroma sample values nearest the block boundary/intersection:

$$p_0'=\text{Clip1}_C(p_0+\Delta), \text{ and}$$

$$q_0'=\text{Clip1}_C(q_0+\Delta),$$

where the function $\text{Clip1}_C(a)$ clips a to be between 0 and the maximum value possible for a chroma sample value, inclusive.

In the preceding examples, the filter applied to sample values in a diagonal line between diagonally adjacent blocks is the same as the filter applied to sample values in a horizontal or vertical line between horizontal or vertically adjacent blocks. Alternatively, the filter applied to sample values in a diagonal line between diagonally adjacent blocks can have different taps or offsets, to account for different distances between sample values (e.g., distances increased by a factor of $\sqrt{2}$ for sample values in a diagonal line, compared to sample values in a horizontal line or vertical line).

In the preceding examples, diagonal filtering is potentially applied between two diagonally adjacent intra-coded blocks, two diagonally adjacent inter-coded blocks, or an intra-coded block that is diagonally adjacent to an inter-coded block. Alternatively, diagonal filtering is only used between two diagonally adjacent inter-coded blocks.

In other example implementations, the boundary-intersection-based deblock filtering applies filtering rules and filters based on the filtering rules and filters of the H.264 standard, VP8 format, VP9 format, or another codec format or standard. For example, the filtering rules and filters are unchanged for horizontal filtering and vertical filtering. For diagonal filtering between two diagonally adjacent blocks, however, filtering rules can be adapted by replacing a horizontally or vertically adjacent block with a diagonally adjacent block. The filter applied diagonally between diagonally adjacent blocks can be the same as the filter applied horizontally or vertically, or the filter can have different taps or offsets, so as to account for different distances between sample values.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system that implements one or more of a video encoder and a video decoder, a method comprising:
   buffering multiple blocks of a reconstructed picture of a video sequence, the multiple blocks including a current block, a first neighboring block that is horizontally adjacent the current block, a second neighboring block that is vertically adjacent the current block, and a third neighboring block that is diagonally adjacent the current block; and
   performing deblock filtering between at least some of the multiple blocks, including, for deblock filtering across a block-boundary intersection between the current block, the first neighboring block, the second neighboring block, and the third neighboring block:
   based at least in part on evaluation of one or more characteristics of the current block, one or more characteristics of the first neighboring block, and one or more characteristics of the second neighboring block, determining to perform selective filtering of at least some sample values in a diagonal line that passes through at least part of the current block and at least part of the third neighboring block, wherein the diagonal line crosses the current block and the third neighboring block at the block-boundary intersection;

based at least in part on evaluation of one or more characteristics of the third neighboring block, assigning a filter strength for the selective filtering of the at least some sample values in the diagonal line; and selectively filtering the at least some sample values in the diagonal line.

2. The method of claim 1, wherein the performing the deblock filtering between the at least some of the multiple blocks further includes one or more of:

selectively filtering at least some sample values in a horizontal line that crosses a vertical boundary between the current block and the first neighboring block; and selectively filtering at least some sample values in a vertical line that crosses a horizontal boundary between the current block and the second neighboring block.

3. The method of claim 1, wherein, for each of the current block, the first neighboring block, and the second neighboring block, the one or more characteristics include one or more of a count of non-zero transform coefficients, a value of a motion vector, and a reference picture used in motion compensation.

4. The method of claim 1, wherein, for each of the current block, the first neighboring block, and the second neighboring block, the one or more characteristics include skipped/not-skipped status.

5. The method of claim 1, wherein, for the deblock filtering across the block-boundary intersection, the selectively filtering the at least some sample values in the diagonal line is performed when the current block is not skipped and the first and second neighboring blocks are skipped.

6. The method of claim 1, wherein the selectively filtering the at least some sample values in the diagonal line depends at least in part on the at least some sample values in the diagonal line that crosses the block-boundary intersection.

7. The method of claim 1, wherein the diagonal line has an angle of 45 or 135 degrees.

8. The method of claim 1, wherein the selectively filtering the at least some sample values in the diagonal line affects a single sample value in each of the current block and the third neighboring block.

9. The method of claim 1, wherein the selectively filtering the at least some sample values in the diagonal line affects multiple sample values in each of the current block and the third neighboring block.

10. The method of claim 1, wherein the diagonal line is a first diagonal line, and wherein the performing deblock filtering between the at least some of the multiple blocks further includes selectively filtering at least some sample values in a second diagonal line, parallel the first diagonal line.

11. The method of claim 1, further comprising:

using the reconstructed picture, including the at least some filtered sample values, as a reference picture during motion compensation for a subsequent picture in the video sequence.

12. One or more computer-readable media storing computer-executable instructions for causing a computer system, when programmed thereby, to perform operations comprising:

buffering multiple blocks of a reconstructed picture of a video sequence, the multiple blocks including a current block, a first neighboring block that is horizontally adjacent the current block, a second neighboring block that is vertically adjacent the current block, and a third neighboring block that is diagonally adjacent the current block; and performing deblock filtering between at least some of the multiple blocks, including, for deblock filtering across a block-boundary intersection between the current block, the first neighboring block, the second neighboring block, and the third neighboring block:

based at least in part on evaluation of one or more characteristics of the current block, one or more characteristics of the first neighboring block, and one or more characteristics of the second neighboring block, determining to perform selective filtering of at least some sample values in a diagonal line that passes through at least part of the current block and at least part of the third neighboring block, wherein the diagonal line crosses the current block and the third neighboring block at the block-boundary intersection;

based at least in part on evaluation of one or more characteristics of the third neighboring block, assigning a filter strength for the selective filtering of the at least some sample values in the diagonal line; and selectively filtering the at least some sample values in the diagonal line.

13. The one or more computer-readable media of claim 12, wherein, for each of the current block, the first neighboring block, and the second neighboring block, the one or more characteristics include one or more of a count of non-zero transform coefficients, a value of a motion vector, a reference picture used in motion compensation, and skipped/not-skipped status.

14. A computer system comprising:

a buffer configured to store multiple blocks of a reconstructed picture of a video sequence, the multiple blocks including a current block, a first neighboring block that is horizontally adjacent the current block, a second neighboring block that is vertically adjacent the current block, and a third neighboring block that is diagonally adjacent the current block; and a video decoder configured to perform deblock filtering between at least some of the multiple blocks, wherein the video decoder is configured to, for deblock filtering across a block-boundary intersection between the current block, the first neighboring block, the second neighboring block, and the third neighboring block:

based at least in part on evaluation of one or more characteristics of the current block, one or more characteristics of the first neighboring block, and one or more characteristics of the second neighboring block, determine to perform selective filtering of at least some sample values in a diagonal line that passes through at least part of the current block and at least part of the third neighboring block, wherein the diagonal line crosses the current block and the third neighboring block at the block-boundary intersection;

based at least in part on evaluation of one or more characteristics of the third neighboring block, assign a filter strength for the selective filtering of the at least some sample values in the diagonal line; and selectively filter the at least some sample values in the diagonal line.

15. The computer system of claim 14, wherein, for each of the current block, the first neighboring block, and the second neighboring block, the one or more characteristics include one or more of a count of non-zero transform coefficients, a value of a motion vector, a reference picture used in motion compensation, and skipped/not-skipped status.

16. The computer system of claim 14, wherein the deblock filtering between the at least some of the multiple blocks further includes one or more of:

selectively filtering at least some sample values in a horizontal line that crosses a vertical boundary between the current block and the first neighboring block; and selectively filtering at least some sample values in a vertical line that crosses a horizontal boundary between the current block and the second neighboring block.

17. The computer system of claim 14, wherein, for the deblock filtering across the block-boundary intersection, the selectively filtering the at least some sample values in the diagonal line is performed when the current block is not skipped and the first and second neighboring blocks are skipped.

18. The one or more computer-readable media of claim 12, wherein the performing the deblock filtering between the at least some of the multiple blocks further includes one or more of:

selectively filtering at least some sample values in a horizontal line that crosses a vertical boundary between the current block and the first neighboring block; and selectively filtering at least some sample values in a vertical line that crosses a horizontal boundary between the current block and the second neighboring block.

19. The one or more computer-readable media of claim 12, wherein, for the deblock filtering across the block-boundary intersection, the selectively filtering the at least some sample values in the diagonal line is performed when the current block is not skipped and the first and second neighboring blocks are skipped.

\* \* \* \* \*